United States Patent
Sakamoto et al.

[11] Patent Number: 5,315,407
[45] Date of Patent: May 24, 1994

[54] METHOD OF AND APPARATUS FOR GENERATING HALFTONE DOTS

[75] Inventors: Takashi Sakamoto, Kyoto; Nobuaki Usui, Tokyo, both of Japan

[73] Assignee: Dainippon Screen Mfg. Co., Ltd., Tokyo, Japan

[21] Appl. No.: 76,048

[22] Filed: Jun. 16, 1993

[30] Foreign Application Priority Data

Jul. 10, 1992 [JP] Japan .................... 4-207234

[51] Int. Cl.$^5$ .............................. H04N 1/40
[52] U.S. Cl. .................. 358/456; 358/459; 358/460
[58] Field of Search ............ 358/456, 459, 460, 534, 358/536, 535, 298, 458, 457, 455, 454

[56] References Cited

U.S. PATENT DOCUMENTS

| | | | |
|---|---|---|---|
| 4,499,489 | 2/1985 | Gall et al. | 358/536 |
| 4,543,613 | 9/1985 | Sakamoto | 358/534 |
| 4,673,971 | 6/1987 | Ikuta et al. | 358/460 |
| 4,680,720 | 7/1987 | Yoshii et al. | 358/456 |
| 4,700,235 | 10/1987 | Gall | 358/459 |
| 4,825,298 | 4/1989 | Ikuta et al. | 358/456 |
| 4,912,562 | 3/1990 | Fenster et al. | 358/459 |
| 4,985,779 | 1/1991 | Gall | 358/456 |

*Primary Examiner*—Edward L. Coles, Sr.
*Assistant Examiner*—Scott A. Rogers
*Attorney, Agent, or Firm*—Lowe, Price, LeBlanc & Becker

[57] ABSTRACT

The present invention produces halftone dots which shows smaller fluctuations in size and shape irrespective of variation of the positional relation between the address of screen pattern data and the recording pixels. Displacement F1 through F4 are computed at vertices of a halftone dot region VP1 through VP4. Each of the vertices is shifted to a lattice point of the scanning coordinate systems, and the X-Y coordinates of each lattice point in the scanning coordinate systems are corrected accordingly. The displacement of an arbitrary lattice point A is interpolated from the displacement F1 through F4 on the basis of the distance between each vertex and the lattice point A. As a result, the positional relation between the address of the screen pattern and the position of the recording pixels is maintained constant in the vicinity of the vertices, and this reduces the fluctuations in size and shape of the halftone dots. The center of each halftone dot region can be shifted to a lattice point in the scanning coordinate systems.

16 Claims, 28 Drawing Sheets

DISPLACEMENT TABLE DT

Δu(Ix,Iy)  Δv(Ix,Iy)

| Ix \ Iy | 0 | 1 | 2 |
|---|---|---|---|
| 0 | Δu(0,0) | Δu(0,1) | Δu(0,2) |
| 1 | Δu(1,0) | Δu(1,1) | Δu(1,2) |
| 2 | Δu(2,0) | Δu(2,1) | Δu(2,2) |

Fig. 18

DTa

Δx(Ix,Iy)  Δy(Ix,Iy)

| Ix \ Iy | 0 | 1 | 2 |
|---|---|---|---|
| 0 | Δx(0,0) | Δx(0,1) | Δx(0,2) |
| 1 | Δx(1,0) | Δx(1,1) | Δx(1,2) |
| 2 | Δx(2,0) | Δx(2,1) | Δx(2,2) |

METHOD OF AND APPARATUS FOR GENERATING HALFTONE DOTS

BACKGROUND OF THE INVENTION

1. Field of the Invention

The present invention relates to a method of and an apparatus for generating halftone dots to reproduce a halftone image.

2. Description of the Related Art

In printing process, halftone images of four primary colors, that is, yellow (Y), magenta (m), cyan (C), and black (K), are printed with respective inks on a printing sheet to produce a color print. Each halftone image includes a large number of halftone dots which represent density variation in the image, and each halftone dot includes a number of painted pixels. The larger the number of painted pixels in a halftone dot, the larger the halftone dot; the larger the halftone dots, the darker the halftone image becomes.

The halftone image on the film is generally produced with a scanner which includes a reading unit for reading an original color image to capture color separation image signals, and a recording unit for exposing a photosensitive film to reproduce halftone images on the film. The color separation image signals represent density variations of the respective four primary colors in the original color image. The recording unit compares each image signal with specific screen pattern data, which represent threshold values, to generate an exposure control signal for each recording pixel as a result of the comparison, and exposes a halftone image on a photosensitive film while ON-OFF controlling a light beam in response to the exposure control signal.

FIG. 1 shows an example of screen pattern data for one halftone dot region, which is the maximum region of one halftone dot. In FIG. 1, one halftone dot region is made of 32×32 pixels, to each of which a threshold value ranging from 0 through 255 is assigned. The threshold value for each pixel is compared with the level of the image signal, and those pixels that have the threshold values no more than the level of the image signal are to be exposed. For example, when the level of the image signal is 64 over the 32×32 pixels, the shaded areas at the corners of the halftone dot region are exposed to make halftone dots. If the level of the image signal is 255, all pixels in the halftone dot region are exposed.

When superimposed to make a color print, the four halftone images might cause a so-called "moire". orientation angles, or screen angles, of the four halftone images are generally set at different values to prevent the moire. FIGS. 2A through 2D show halftone dot arrangements where the screen angles $\theta$ are set at 0 degrees, 15 degrees, 45 degrees, and 75 degrees, respectively.

The production of the four dot arrangements with different screen angles $\theta$ can be executed by two typical methods, that is, Rational Tangent Method and Irrational Tangent Method. Tangent of each screen angle $\theta$ (tan $\theta$) is set at a rational number in the Rational Tangent Method, and it is set at an irrational number in the Irrational Tangent Method.

FIG. 3 is a conceptive view illustrating an arrangement of screen pattern data for the screen angle $\theta$ of about fifteen degrees according to the Rational Tangent method. FIG. 3 includes four halftone dot regions. U denotes a primary scanning direction and V denotes a secondary scanning direction. In the Rational Tangent Method, screen pattern data is prepared such that it is addressed along each primary scanning line. Even if a scanning line SL runs through three halftone dot regions HD1, HD2, and HD3, the screen pattern data is successively read out along the scanning line SL. The Rational Tangent Method therefore requires four sets of screen pattern data for the four screen angles, respectively, so that the screen pattern data can be addressed along the primary scanning line at each screen angle.

It is sometimes required to change a screen ruling, or the number of halftone dots per inch, of the halftone image. The screen ruling is changed by adjusting a diameter and an interval of beam spots of a light beam to be focused on the photosensitive film in the Rational Tangent Method. This, however, requires a conglicated shuttle mechanism moving in the secondary scanning direction and an expensive optical system which can change the diameter and interval of the beam spots.

The Irrational Tangent Method, on the other hand, can change the screen ruling relatively easily. The Irrational Tangent Method needs only one set of screen pattern data which are assigned to pixels in one halftone dot region as shown in FIG. 1, and reads out the screen pattern data as a function of the screen angle $\theta$. FIG. 4 illustrates a method of reading out screen pattern data in the Irrational Tangent Method. X-Y coordinates indicate an address of a screen pattern memory, or a memory for storing screen pattern data, and U and V denote primary and secondary scanning directions, respectively. The U-V coordinates of an arbitrary point A are transformed into the X-Y coordinates as follows:

$$X = U^*\cos\theta + V^*\sin\theta \tag{1a}$$

$$Y = -U^*\sin\theta + V^*\cos\theta \tag{1b}$$

where "*" denotes multiplication. When assuming $U = m^*p$ and $V = n^*p$, Equations (1a) and (1b) are rewritten as follows:

$$X = m^*p^*\cos\theta + n^*p^*\sin\theta \tag{2a}$$

$$Y = -m^*p^*\sin\theta + n^*p^*\cos\theta \tag{2b}$$

where "m" and "n" are integers and "p" denotes a pitch of recording pixels, or a side length of a recording pixel.

Since the secondary scanning coordinate v is constant on each primary scanning line, the integer "n" is also constant on each scanning line. Therefore, only the first terms of Equations (2a) and (2b) change in reading out the screen pattern data along each scanning line. According to Equations (2a) and (2b), one-pixel progress in the primary scanning direction increases the X coordinate by $p^*\cos\theta$ and the Y coordinate by $p^*\sin\theta$. Accordingly, the screen pattern data for only one halftone dot region shown in FIG. 1 is sufficient to produce halftone dot arrangements at any screen angle in the Irrational Tangent Method. Furthermore, the screen ruling is also changeable by adjusting the pixel pitch p.

FIG. 5 shows the relationship between the arrangement of recording pixels and the address on the screen pattern memory in the Irrational Tangent Method. Recording pixels RP shown as circles are disposed along scanning lines SL1 and SL2. Addresses of the screen pattern data are positioned at the centers of the grid shown in FIG. 5. The coordinate axes of the X-Y coordinate systems run through the center of the address (0, 0) accordingly.

The scanning coordinates (U, V) for each recording pixel are transformed into the address coordinates (X, Y) according to the above Equations (2a) and (2b). In the example of FIG. 5, screen pattern data stored at the address (0, 0), (2, 1), and (3, 1) are successively read out when a series of recording pixels RP disposed on the first scanning line SL1 are to be exposed. In a similar manner, when a series of recording pixels RP disposed on the second scanning line SL2 are to be exposed, screen pattern data stored at the address (0, 2) and (1, 2) are read out. In the Irrational Tangent Method, the address on the screen pattern memory does not go along the primary scanning direction U, and some addresses on the screen pattern memory are skipped in producing halftone dots. If $\tan \theta$ is an irrational number, positional relation between a recording pixel and a corresponding address of the screen pattern memory varies at each recording pixel. Therefore the addresses which are referred to in a certain halftone dot region are generally different from those referred to in adjacent halftone dot regions.

Since the positional relation between a recording pixel and a corresponding address of the screen pattern memory varies with respect to each halftone dot region, the size of halftone dots, or the number of pixels in the halftone dots, fluctuates accordingly even if those halftone dots are produced as a function of an image signal of a constant level. FIG. 6 shows an example of plural halftone dots generated as a function of an image signal with a constant level. Lattice points in FIG. 6 correspond to the centers of recording pixels RP, and circular regions Rex represents the address range of the screen pattern data which are no more than the level of the image signal, that is, the address range in which the recording pixels are exposed. Incidentally, the coordinate axes of the U-V systems run through the center of the recording pixel at an origin O.

The screen pattern data is read out by the address corresponding to the center of the recording pixel RP, which is shown as a lattice point in FIG. 6. The screen pattern data thus read out is compared with the image signal to determine whether the recording pixel RP is exposed or not. As a result, the recording pixels whose centers are located in the region Rex are exposed, and the other pixels are not exposed. The exposed pixels are shown as shaded polygons in FIG. 6. The number of the exposed pixels in a halftone dot ranges from 9 to 12 in this example.

In the Irrational Tangent Method, variation in the positional relation between the address of the screen pattern data and the recording pixels causes fluctuations in size and shape of halftone dots. In other words, halftone dots which are produced as a function of an image signal of a constant level do not have the same area. The variation in the positional relation increases the darkness in some image areas while increasing the lightness in other image areas, thus causing uneven and unstable image reproduction.

Several methods have been proposed to suppress the unevenness of a reproduced image. A method which adds a random number to the address bas been proposed, but this method has a disadvantage of deforming halftone dots. Another method is to shift or distort each halftone dot region at random. The second method, however, could not efficiently suppress fluctuations in size and shape of halftone dots. There is still another method which changes the distribution of light quantity of a light beam. The third method, however, requires a relatively complicated optical system for changing the light quantity of the light beam.

SUMMARY OF THE INVENTION

An object of the present invention is to suppress undesirable fluctuation in halftone dot area which is caused by variation in the positional relation between the address of screen pattern data and the recording pixels.

A method of generating halftone dots each consisting of a plurality of pixels as a function of given image signals comprises the steps of: (a) preparing a screen pattern memory for storing a plurality of threshold values arranged in each of matrices laid out in Cartesian X-Y coordinate systems, each of the matrices including at least one reference point which has an extreme of the plurality of threshold values; (b) arranging the pixels at lattice points in Cartesian U-V coordinate systems, the U and V denoting a primary scanning direction and a secondary scanning direction, respectively, the U-V coordinate systems being set in predetermined relation to the X-Y coordinate systems; (c) obtaining displacement of the reference point in each of the matrices from an lattice point of the U-V coordinate systems adjacent to the reference point; (d) obtaining X-Y coordinates of a target lattice point in the U-V coordinate systems while correcting the X-Y coordinates of the target lattice point with displacement of the target lattice point interpolated from the displacement of a plurality of the reference points, the plurality of the reference points existing in the vicinity of the target lattice point; (e) addressing the screen pattern memory by the corrected X-Y coordinates to thereby read out the threshold value for the target lattice point; and (f) comparing the threshold value for the target lattice point and the given image signal to determine whether or not to expose a pixel at the target lattice point.

In accordance with another aspect of the invention, a position of the reference point in the X-Y coordinate systems is expressed by an integral number part of the X-Y coordinates while the position of the reference point within each of the matrices is expressed by a decimal fraction part of the X-Y coordinates, and the plurality of the reference points referred to at the step (d) are represented by rounded values of the X-Y coordinates of the target lattice point.

In a preferred embodiment of the present invention, the step (c) comprises the steps of: calculating the displacement of the reference point in each of the trices with respect to each set of integral coordinates of the X-Y coordinates systems; and storing the displacement with respect to the each set of integral coordinates of the X-Y coordinate systems in a memory; and wherein the step (d) comprises the step of: reading out the displacement of the plurality of the reference points by the rounded values of the X-Y coordinates of the target lattice point.

Preferably, the displacement stored in the memory is expressed in the U-V coordinate systems or in the X-Y coordinate systems.

The at least one reference point in each of the matrices includes four corner points of each of the matrices. Also the at least one reference point in each of the matrices includes a center of each of the matrices.

In accordance with still another aspect of the present invention, the step (d) comprises the step of: re-correcting the corrected X-Y coordinates of the target lattice point by a predetermined shift of position such that the reference point in each of the matrices is shifted to a predetermined position apart from symmetric axes of the U-V coordinate systems according to the predetermined shift.

An apparatus for generating halftone dots each consisting of a plurality of pixels as a function of given image signals comprises: (a) a screen pattern memory for storing a plurality of threshold values arranged in each of matrices laid out in Cartesian X-Y coordinate systems, each of the matrices including at least one reference point which has an extreme of the plurality of threshold values; (b) coordinate signal generation means for generating a coordinate signal representing a position of a target lattice point in Cartesian U-V coordinate systems, the U and V denoting a primary scanning direction and a secondary scanning direction, respectively, the U-V coordinate systems being set in predetermined relation to the X-Y coordinate systems; (c) address generation means for generating an address for the screen pattern memory, comprising: coordinate transforming means for transforming the coordinate signal of the target lattice point from U-V coordinates into X-Y coordinates; displacement generation means for generating displacement with respect to a plurality of the reference points, the reference points existing in the vicinity of the target lattice point, the displacement being a distance from each of the plurality of the reference points to an lattice point of the U-V coordinate systems adjacent to each of the plurality of the reference points; interpolation means for interpolating the displacement of the plurality of the reference points to obtain displacement of the target lattice point; and coordinate correction means for correcting the X-Y coordinates of the target lattice point with the displacement of the target lattice point, to thereby obtain the address of the screen pattern memory corresponding to the coordinate signal; and (e) comparator means for comparing the given image signal and the threshold value for the target lattice point read out from the screen pattern memory by the address to generate an exposure signal indicating whether or not to expose a pixel at the target lattice point.

These and other objects, features, aspects, and advantages of the present invention will become more apparent from the following detailed description of preferred embodiments with the accompanying drawings.

BRIEF DESCRIPTION OF THE DRAWINGS

FIG. 16 shows a displacement table prepared in a second embodiment of the present invention;

FIG. 18 shows a displacement table prepared in a third embodiment of the present invention;

DESCRIPTION OF THE PREFERRED EMBODIMENT

A. Adjustment of vertices of halftone dot region

Figure 7:
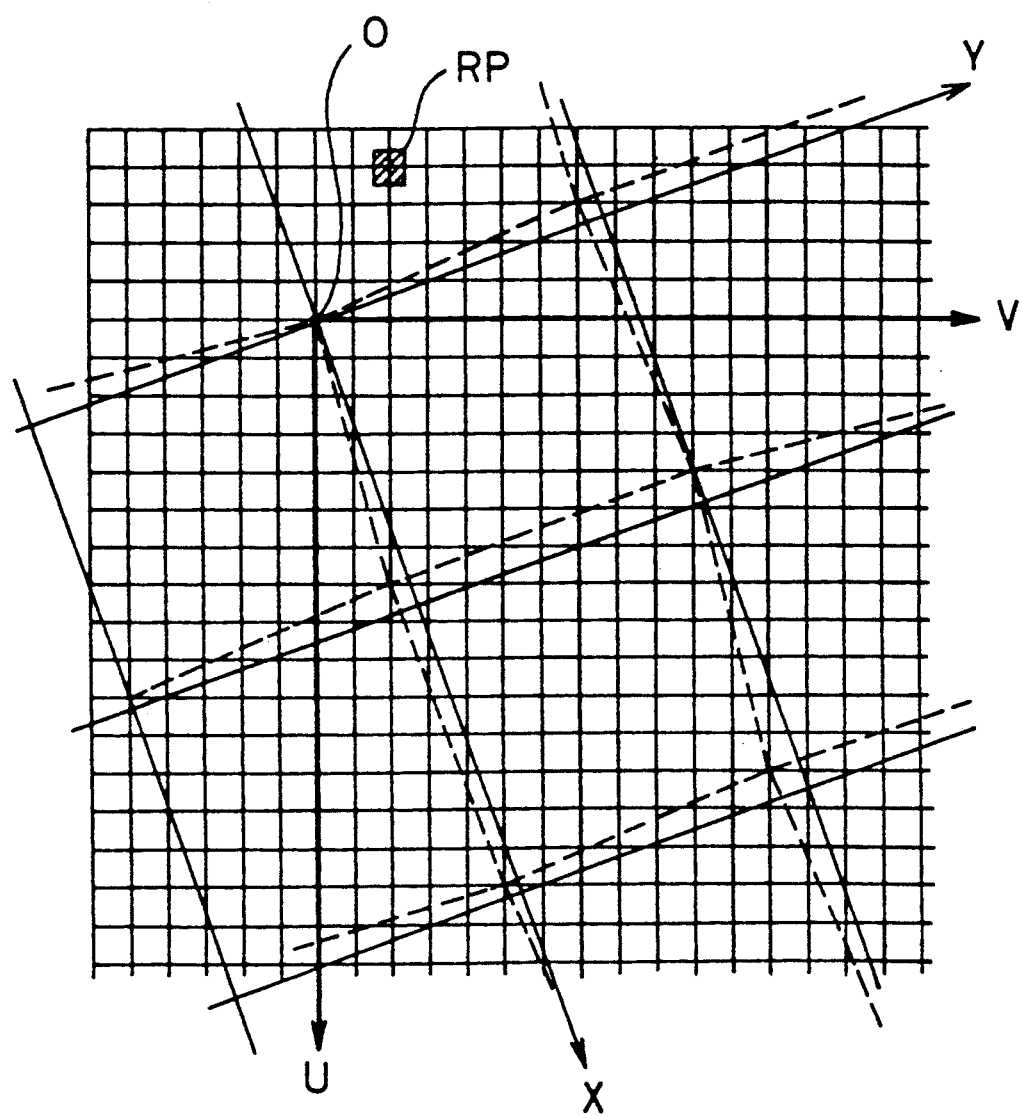
FIG. 7 shows a method of adjusting halftone dot regions according to the present invention.

FIG. 7 shows a method of adjusting vertices of halftone dot regions according to the present invention. The lattice points of the finer grid drawn with solid lines corresponds to centers of recording pixels RP, that is, to coordinates of the scanning coordinate systems, or the U-V coordinate systems. The rougher grid of solid lines indicates the boundaries of halftone dot regions in the screen pattern coordinate systems, or the X-Y coordinate systems. In recording a halftone image, an image signal is compared with screen pattern data with respect to each pixel, or each lattice point of the scanning coordinate systems, and thereby it is determined whether each pixel is to be exposed or not.

Figure 6:
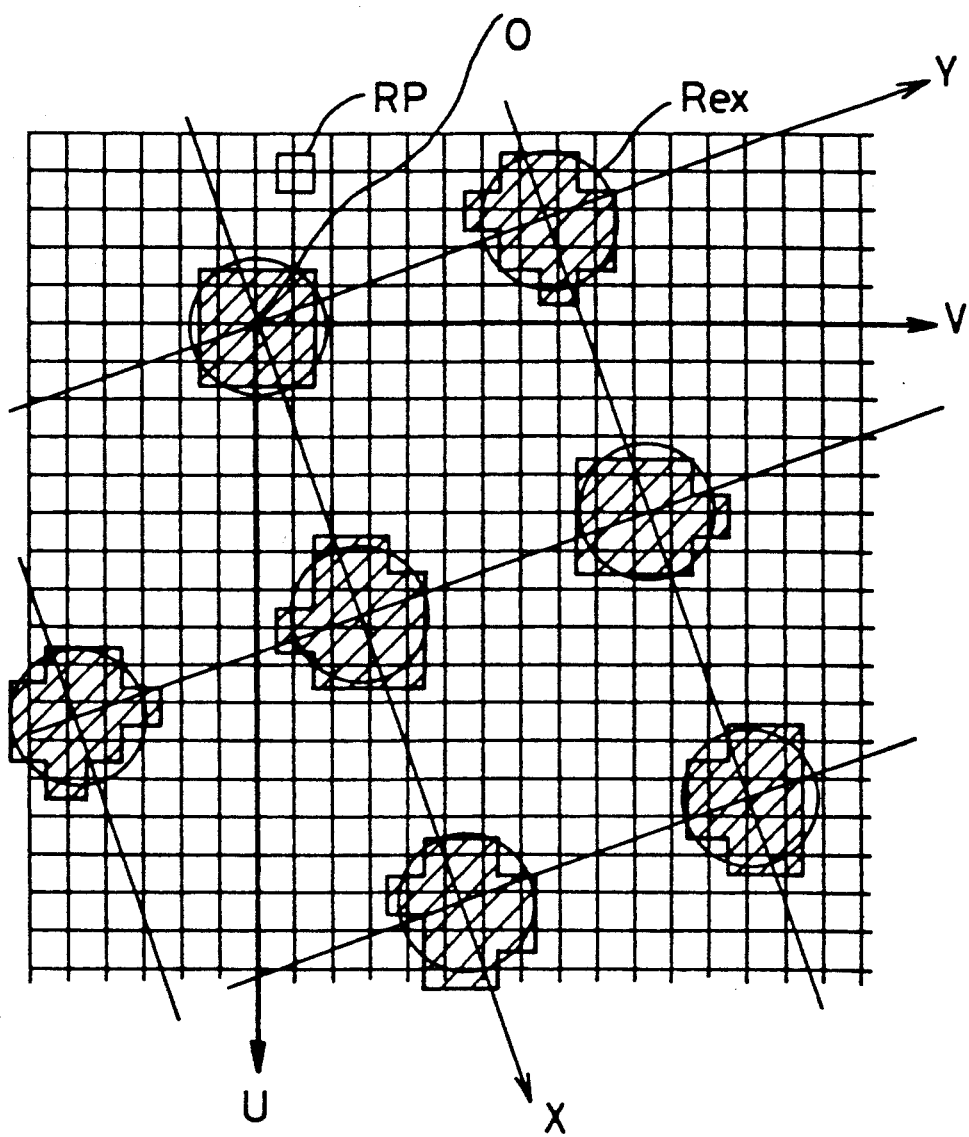
FIG. 6 shows an example of halftone dots formed as a function of an image signal with a constant level.

In FIG. 7, an origin O is common to the U-V coordinate systems and the X-Y coordinate systems. Each of the four vertices of a halftone dot region is ordinarily displaced from a lattice point of the scanning coordinate systems. The reason why the halftone dots varies in size in FIG. 6 is because the vertices of the halftone dot regions are displaced from the lattice points by various displacement.

According to a first embodiment of the present invention, each vertex of the halftone dot region is shifted to one of its adjacent lattice points of the scanning coordinate systems, as shown with broken lines in FIG. 7, and the halftone dot regions are deformed accordingly. In order to adjust the position of each vertex, the displacement of each vertex from the adjacent lattice point is calculated, as will be described later in detail. Then, address for the recording pixel at each lattice point is corrected on the basis of the displacement. The corrected address is used to read out screen pattern data, which is compared with the image data to determine whether the recording pixel is exposed or not.

By positioning the vertices of the halftone dot regions at the lattice points of the scanning coordinate systems, the positional relation between recording pixels and the addresses of screen pattern data is made approximately constant in the proximity of the vertices, and this prevents the undesirable fluctuation in halftone dot area.

B. Calculation of displacement and address correction

The displacement of each of the four vertices of a halftone dot region is calculated as follows. The both sides of each of Equations (2a) and (2b) are divided by the side length of a halftone dot region S:

$$X/S = (m^*p^*\cos\theta + n^*p^*\sin\theta)/S \quad (3a)$$
$$= Ix + x$$

$$Y/S = (-m^*p^*\sin\theta + n^*p^*\cos\theta)/S \quad (3b)$$
$$= Iy + y$$

where Ix and Iy denote integral number parts, and x and y denote decimal fraction parts, respectively.

Figure 8:
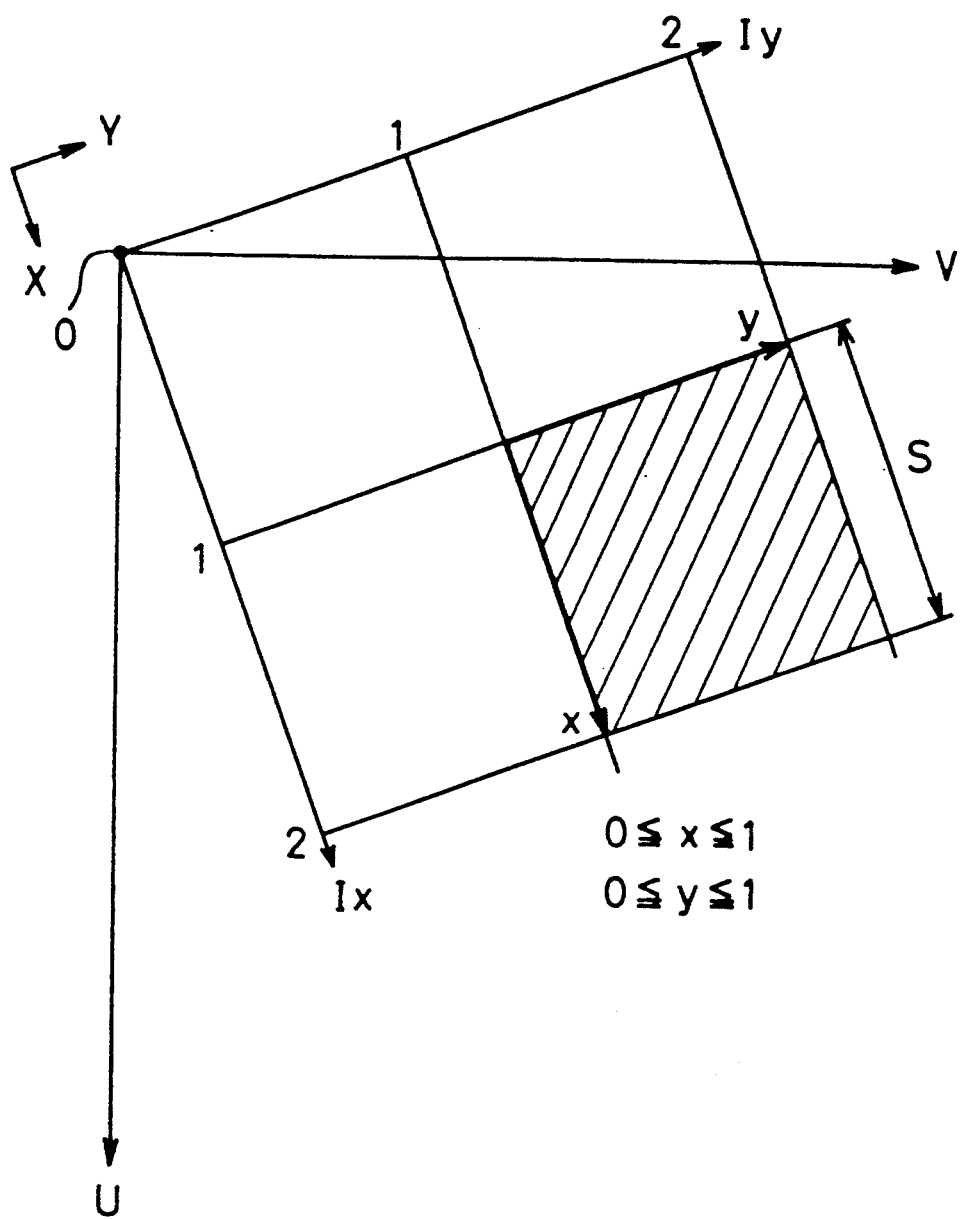
FIG. 8 illustrates the relations among X-Y coordinate systems, Ix-Iy coordinate systems, and x-y coordinate systems.

FIG. 8 illustrates the relations of some coordinate systems. The Ix-Iy coordinate systems indicate a position of each halftone dot region in the X-Y coordinate systems, and the x-y coordinate systems indicate a position within each halftone dot region. In other words, an arbitrary position in the X-Y coordinate systems is expressed by the combination of the Ix-Iy coordinates and the x-y coordinates.

Figure 9:
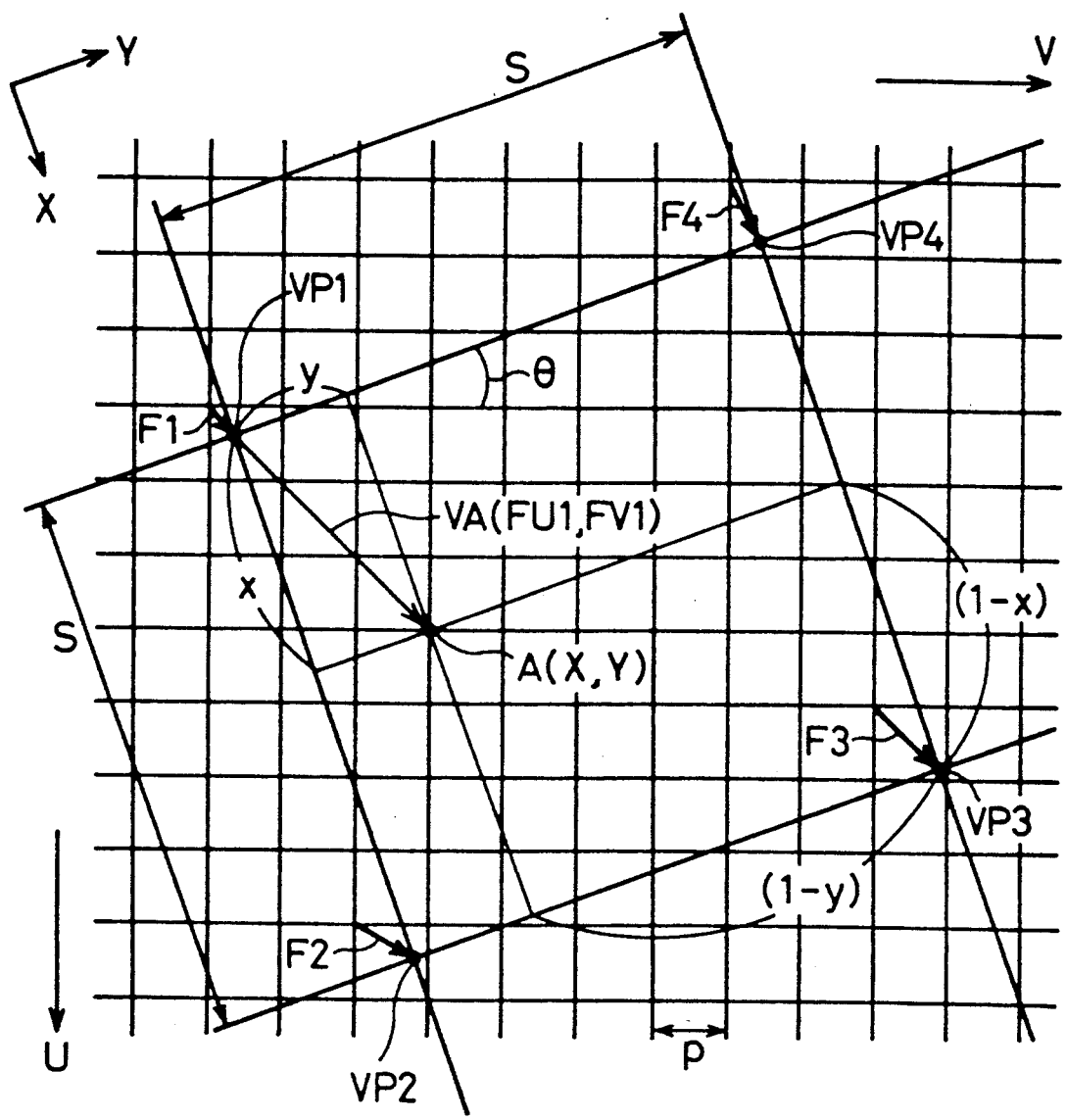
FIG. 9 illustrates displacement of four vertices of a halftone dot region.

FIG. 9 illustrates displacement of four vertices of a halftone dot region which includes an arbitrary lattice point A of the U-V coordinate systems. Each of the displacement F1 through F4 of the respective vertices VP1 through VP4 is represented by a vector which is directed from the adjacent lattice point at the upper left of each vertex to the vertex itself. In this embodiment, the displacement F1 through F4 is expressed by the U-V coordinate systems. In calculating the displacement F1 (u1, v1) of the vertex VP1, a vector VA(FU1, FV1) which is directed from the vertex VP1 to the lattice point A(x, y) is first obtained as follows:

$$FU1 = (x^*\cos\theta - y^*\sin\theta)/p \quad (4a)$$

$$FV1 = (x^*\sin\theta + y^*\cos\theta)/p \quad (4b)$$

The components u1 and v1 of the displacement F1 of the vertex VP1 are given by $$u1 = INT[FU1+1] - FU1 \quad (5a)$$

$$v1 = INT[FV1+1] - FV1 \quad (5b)$$

where the operator INT means to make an integer which is the greatest of all the integers no more than the value in the parentheses. The example of FIG. 9 gives (FU1, FV1) = (2.6, 2.7) and (u1, v1) = (0.4, 0.3). In other words, the components u1 and v1 are given by subtracting the decimal fraction parts of the components FU1 and FV1 from one, respectively.

The components of the displacement of the other vertices VP2, VP3, and VP4 are given in the similar manner as follows:

Displacement F2(u2, v2) of the vertex VP2:

$$FU2 = \{(x-1)^*\cos\theta - y^*\sin\theta\}/p \quad (6a)$$

$$FV2 = \{(x-1)^*\sin\theta + y^*\cos\theta\}/p \quad (6b)$$

$$u2 = INT[FU2+1] - FU2 \quad (7a)$$

$$v2 = INT[FV2+1] - FV2 \quad (7b)$$

Displacement F3(u3, v3) of the vertex VP3:

$$FU3 = \{(x-1)^*\cos\theta - (y-1)^*\sin\theta\}/p \quad (8a)$$

$$FV3 = \{(x-1)^*\sin\theta + (y-1)^*\cos\theta\}/p \quad (8b)$$

$$u3 = INT[FU3+1] - FU3 \quad (9a)$$

$$v3 = INT[FV3+1] - FV3 \quad (9b)$$

Displacement F4(u4, v4) of the vertex VP4:

$$FU4 = \{x^*\cos\theta - (y-1)^*\sin\theta\}/p \quad (10a)$$

$$FV4 = \{x^*\sin\theta + (y-1)^*\cos\theta\}/p \quad (10b)$$

$$u4 = INT[FU4+1] - FU4 \quad (11a)$$

$$v4 = INT[FV4+1] - FV4 \quad (11b)$$

As shown in FIG. 9, the displacement F1 through F4 of the vertices VP1 through VP4 are represented by respective vectors directed from lattice points of the scanning coordinate systems to the respective vertices VP1 through VP4. The vertices VP1 through VP4 are therefore shifted to the lattice points by adding the components of the inverted vectors −F1 through −F4 to the coordinates (U, V) of the vertices VP1 through VP4, respectively.

What is required here is an address of the screen pattern data corresponding to the arbitrary lattice point A when the vertices of the halftone dot region are shifted to the lattice points as shown with broken lines in FIG. 7. In order to obtain the address corresponding to the lattice point A, displacement of the lattice point A is interpolated from the displacement F1 through F4 of the four vertices VP1 through VP4 of the halftone dot region which includes the lattice point A on the basis of the distance between each vertex and the lattice point A. Then the address coordinates (X, Y) of the lattice point A is corrected by the displacement of the lattice point A. The corrected coordinates (X, Y) indicate the address of the screen pattern data for the lattice point A.

Figure 10:
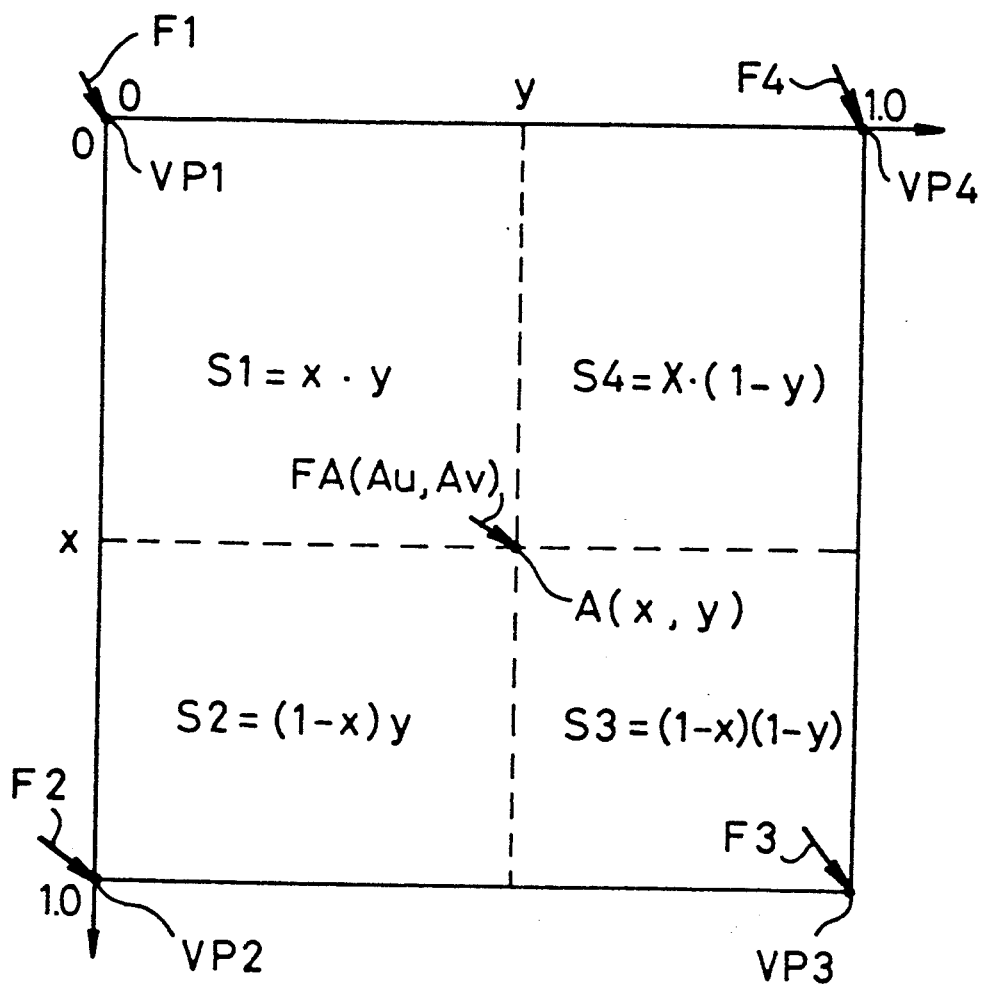
FIG. 10 schematically illustrates Four-point Interpolation Method.

FIG. 10 schematically illustrates Four-point Interpolation Method, which is used in calculating the displacement of the lattice point A. The position of the lattice point A is expressed by coordinates (x, y), where x and y are decimal fractions. The displacement FA(Au, Av) of the lattice point A is given by adding the displacement F1 through F4 at the vertices VP1 through VP4 while weighing them with areas S1 through S4 of the rectangles which are made by dividing the halftone dot region with straight lines drawn through the lattice point A in parallel to the x- and y-axes. The displacement FA(Au, Av) of the lattice point A is given by $$Au = u1(1-x)(1-y) + u2*x*(1-y) + u3*x*y + u4(1-x)y \tag{12a}$$

$$Av = v1(1-x)(1-y) + v2*x*(1-y) + v3*x*y + v4(1-x)y \tag{12b}$$

The displacement FA(Au, Av) is represented by a vector in the U-V coordinate systems here. The coordinates (U, V) of the lattice point A is corrected by adding to them the components of the inverted vector −FA(−Au, −Av) to make corrected coordinates (Uc, Vc) as follows:

$$Uc = U - Au \tag{13a}$$

$$Vc = V - Av \tag{13b}$$

The corrected scanning coordinates (Uc, Vc) are transformed into X-Y coordinates by Equations (2a) and (2b) to make address coordinates (Xc, Yc) of the lattice point A. The coordinates (Xc, Yc) indicate the address of the screen pattern data for the lattice point A.

Figure 11:
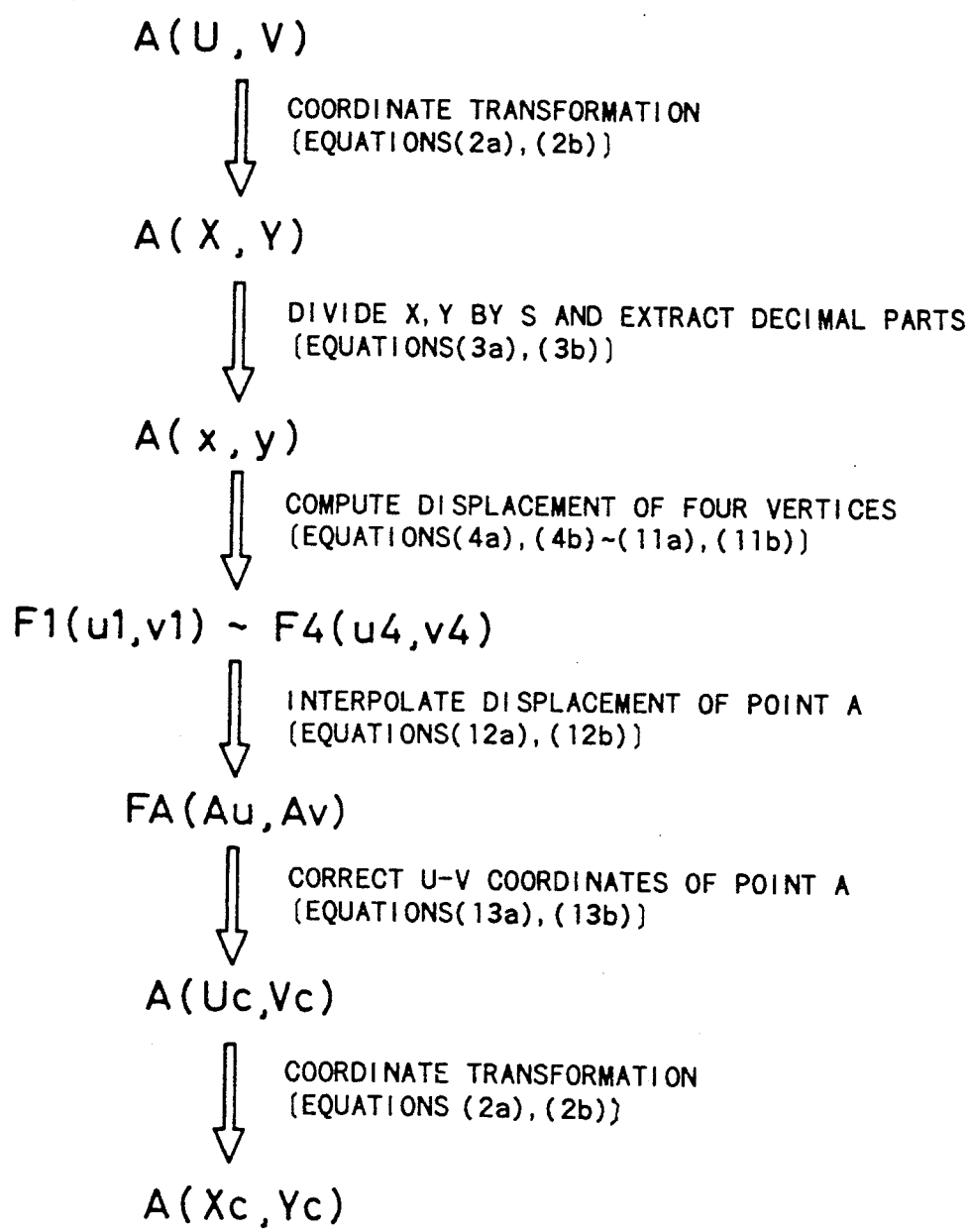
FIG. 11 schematically illustrate the procedure of calculating corrected address (Xc, Yc) of an arbitrary lattice point A.

FIG. 11 schematically illustrate the procedure of calculating the corrected address (Xc, Yc) of the lattice point A according the above method. First, the scanning coordinates (U, V) of the lattice point A are transformed into the address coordinates (X, Y) according to Equations (2a) and (2b). Second, the coordinates (x, y) which indicate the position of the lattice point A within the halftone dot region are calculated from the address coordinates (X, Y) according to Equations (3a) and (3b). Then the displacement F1 through F4 of the four vertices of the halftone dot region which includes the lattice point A are computed from the coordinates (x, y) according to Equations (4a) through (11b). The displacement FA(Au, Av) of the lattice point A is obtained by interpolating the displacement F1 through F4 according to Equations (12a) and (12b). The scanning coordinates (U, V) of the lattice point A are corrected by the displacement FA to make the corrected scanning coordinates (Uc, Vc) according to Equations (13a) and (13b). The corrected scanning coordinates (Uc, Vc) are re-transformed according to Equations (2a) and (2b) to make the corrected address (Xc, Yc) of the lattice point A.

Figure 12:
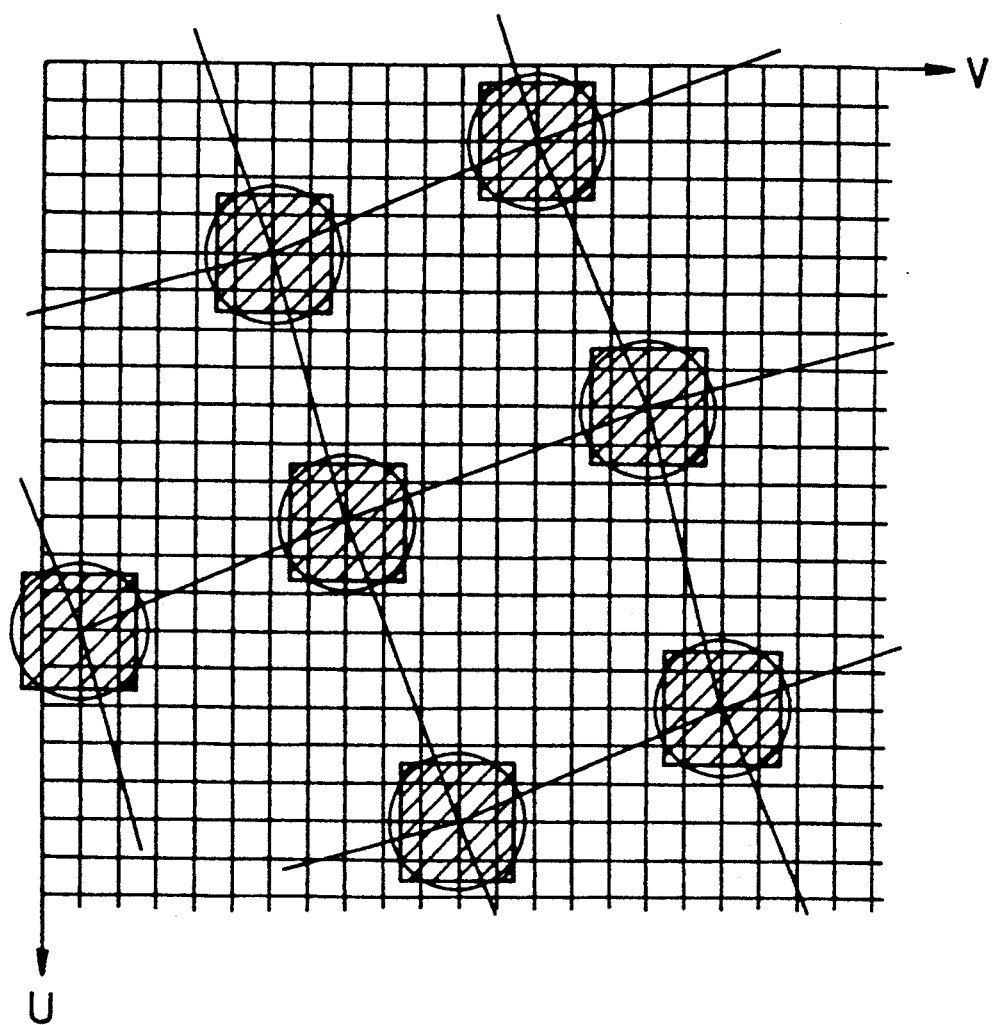
FIG. 12 illustrates halftone dots which are formed when the vertices of halftone dot regions are positioned at lattice points of the scanning coordinate systems.

FIG. 12 illustrates halftone dots formed with the screen pattern data which is read out by the corrected address. Since the vertices of each halftone dot region are shifted to lattice points of the scanning coordinate systems, the halftone dots formed around the vertices of the halftone dot regions have an equal size if the level of the image signal is constant. The unevenness in a reproduced image due to the fluctuation in size of halftone dots is prevented accordingly.

The effect of suppressing the fluctuation in size of halftone dots is clear at the ranges of the halftone dot area rate from 0 to 15% and from 85 to 100%, and especially, from 0 to 5% and from 95 to 100%.

C. Structure and operation of Image Recording Apparatus

Figure 13:
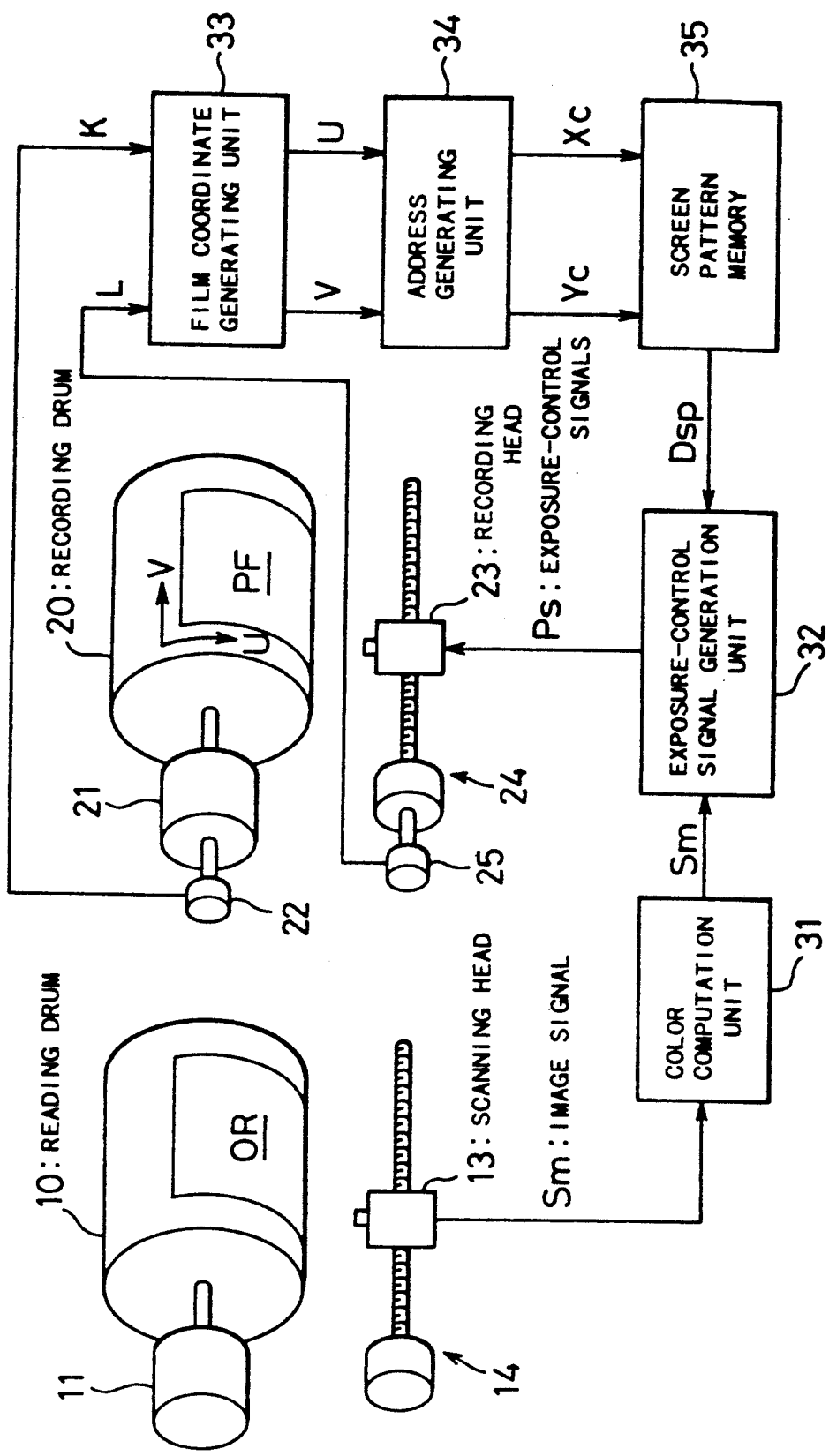
FIG. 13 is a schematic view showing the structure of an image recording apparatus for recording a halftone image according to the dot generation method of a first embodiment of the present invention.

FIG. 13 is a schematic view showing the structure of an image recording apparatus for recording a halftone image according to the method of the first embodiment of the present invention. The image recording apparatus comprises a reading drum 10 to mount an original OR and a recording drum 20 to mount a photosensitive film PF.

The reading drum 10 is driven by a driving motor 11 to rotate around the central axis thereof at a predetermined rotational speed, and simultaneously a scanning head 13 is driven by a shuttle mechanism 14 with a ball thread to move parallel to the central axis at a constant speed. The scanning head 13 scans the image of the original OR along the scanning lines to capture an image signal Sm. The image signal Sm is sent to a color computation unit 31 for executing color correction or tone correction and then supplied to an exposure-control signal generation unit 32.

The recording drum 20 is driven by a driving motor 21 to rotate around the central axis thereof at a predetermined rotational speed, and simultaneously a recording head 23 is driven by a shuttle mechanism 24 with a ball thread to move parallel to the central axis at a constant speed. A rotary encoder 22 rotating with the recording drum 20 generates a positional clock signal K in a primary scanning direction, whereas another rotary encoder 25 rotating with the rotation of a motor of the shuttle mechanism 24 generates another positional clock signal L in a secondary scanning direction.

A film coordinate generating unit 33 converts the clock signals K, L to the coordinates (U, V) in the scanning coordinate systems on the photosensitive film PF. The scanning coordinate systems is expressed in unit of the side length p of a recording pixel. The scanning coordinates (U, V) are supplied to an address generating unit 34.

Figure 1:
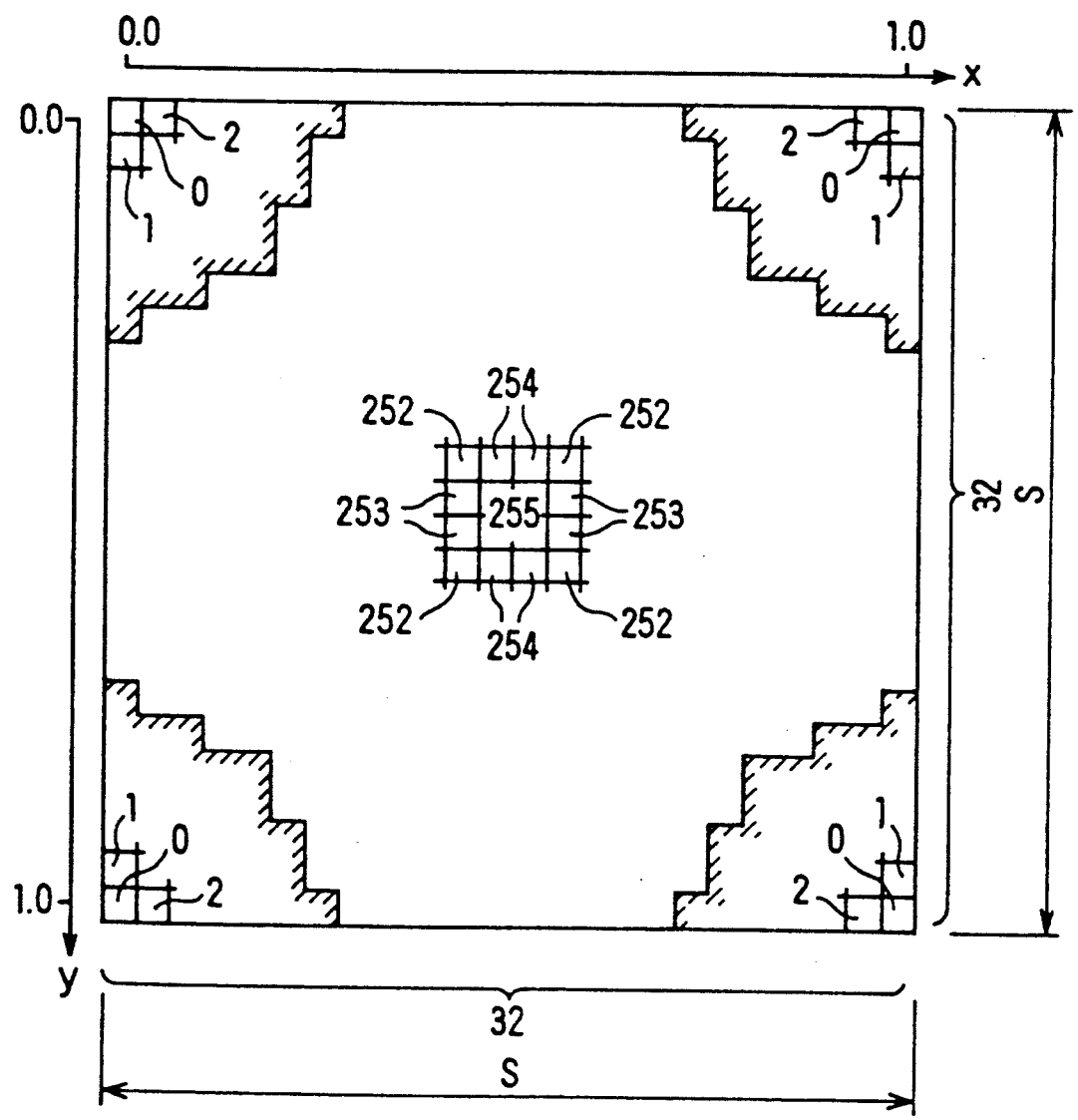
FIG. 1 shows an example of screen pattern data.
Figure 2A:
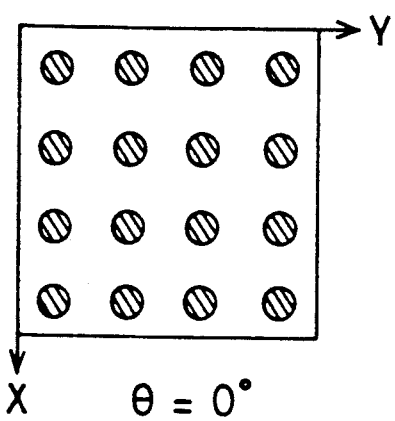
FIGS. 2A through 2D are conceptive views showing halftone dot arrangements for four screen angles, respectively.
Figure 2B:
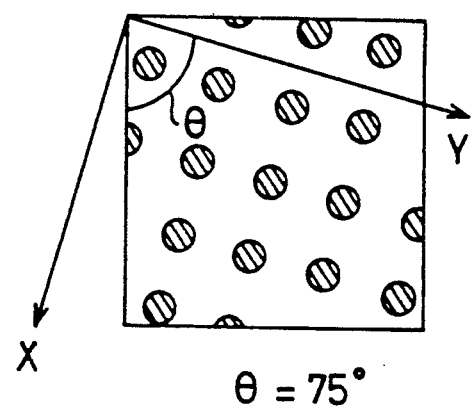
Figure 2C:
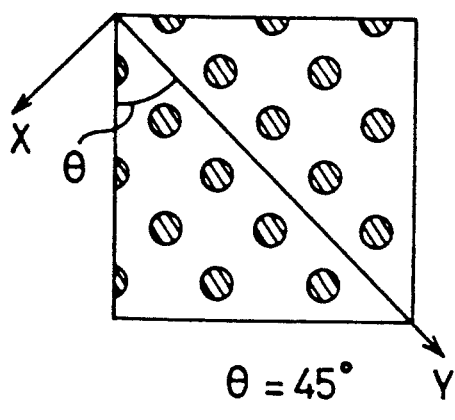
Figure 2D:
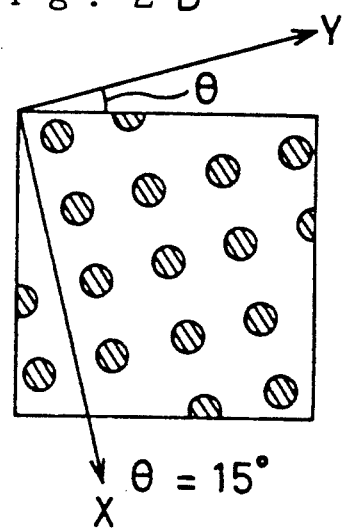
Figure 3:
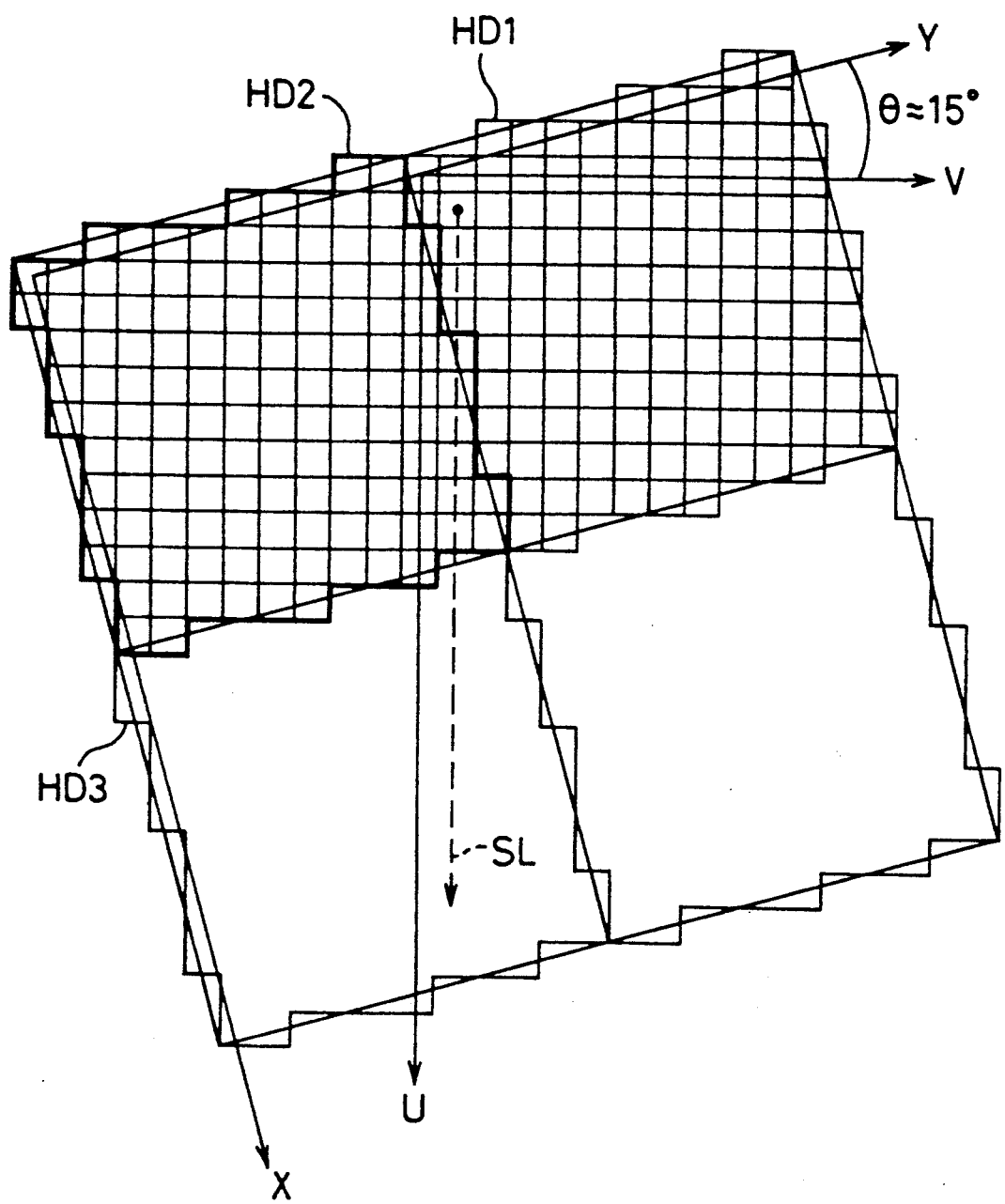
FIG. 3 is a conceptive view showing an arrangement of screen pattern data according to the Rational Tangent Method.
Figure 4:
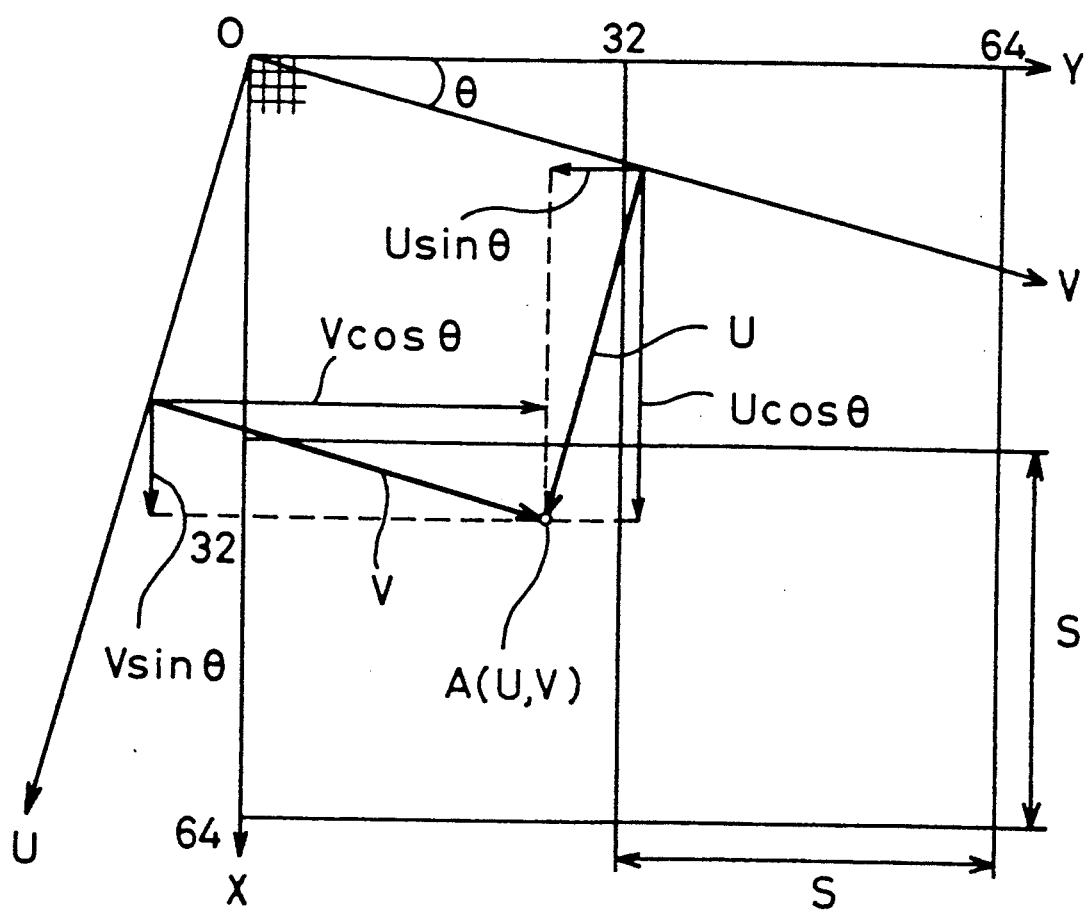
FIG. 4 is a conceptive view showing application of screen pattern data in the Irrational Tangent Method.
Figure 5:
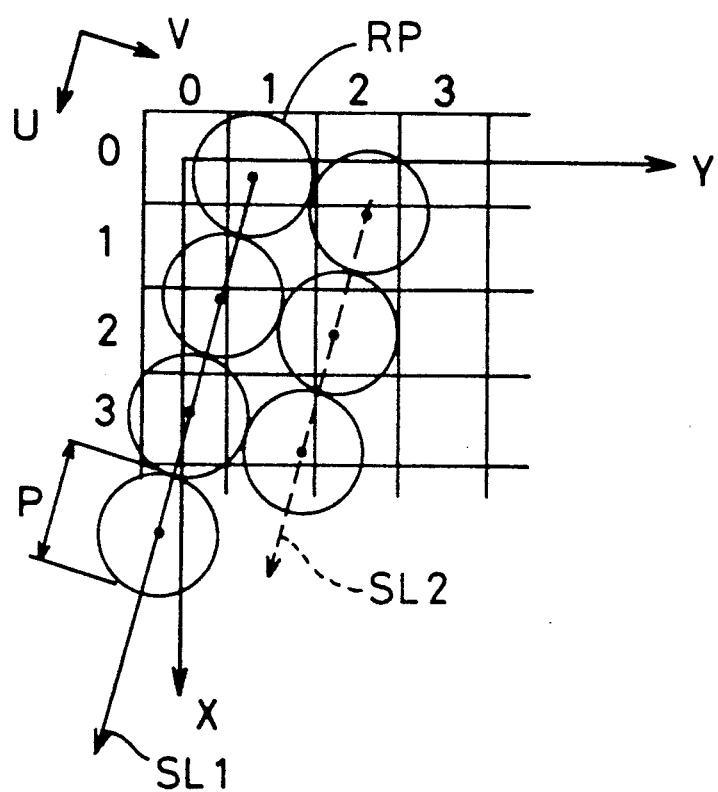
FIG. 5 illustrates the relationship between the arrangement of recording pixels and the address of a screen pattern memory in the Irrational Tangent Method.

The address generating unit 34 calculates the corrected address (Xc, Yc) on the basis of the scanning coordinates (U, V) according to the procedure shown in FIG. 11. The corrected address (Xc, Yc) is sent from the address generating unit 34 to the screen pattern memory unit 35. Consequently, screen pattern data Dsp stored at the address (Xc, Yc) is read out from the screen pattern memory unit 35 and supplied to the exposure-control signal generation unit 32. The screen pattern data Dsp, as shown in FIG. 1 for example, includes threshold values arranged in a matrix corresponding to one halftone dot region with the screen angle of zero degree.

The exposure-control signal generation unit 32 compares the image signal Sm with the screen pattern data Dsp, and generates an exposure-control signal Ps indicating whether each recording pixel is to be exposed or not. The exposure-control signal Ps becomes High level when Dsp is less than Sm, and it becomes Low level when Dsp is no less than Sm. The recording head 23 on-off controls a laser beam in response to the exposure-control signal Ps to record a halftone image on the photosensitive film PF.

Figure 14:
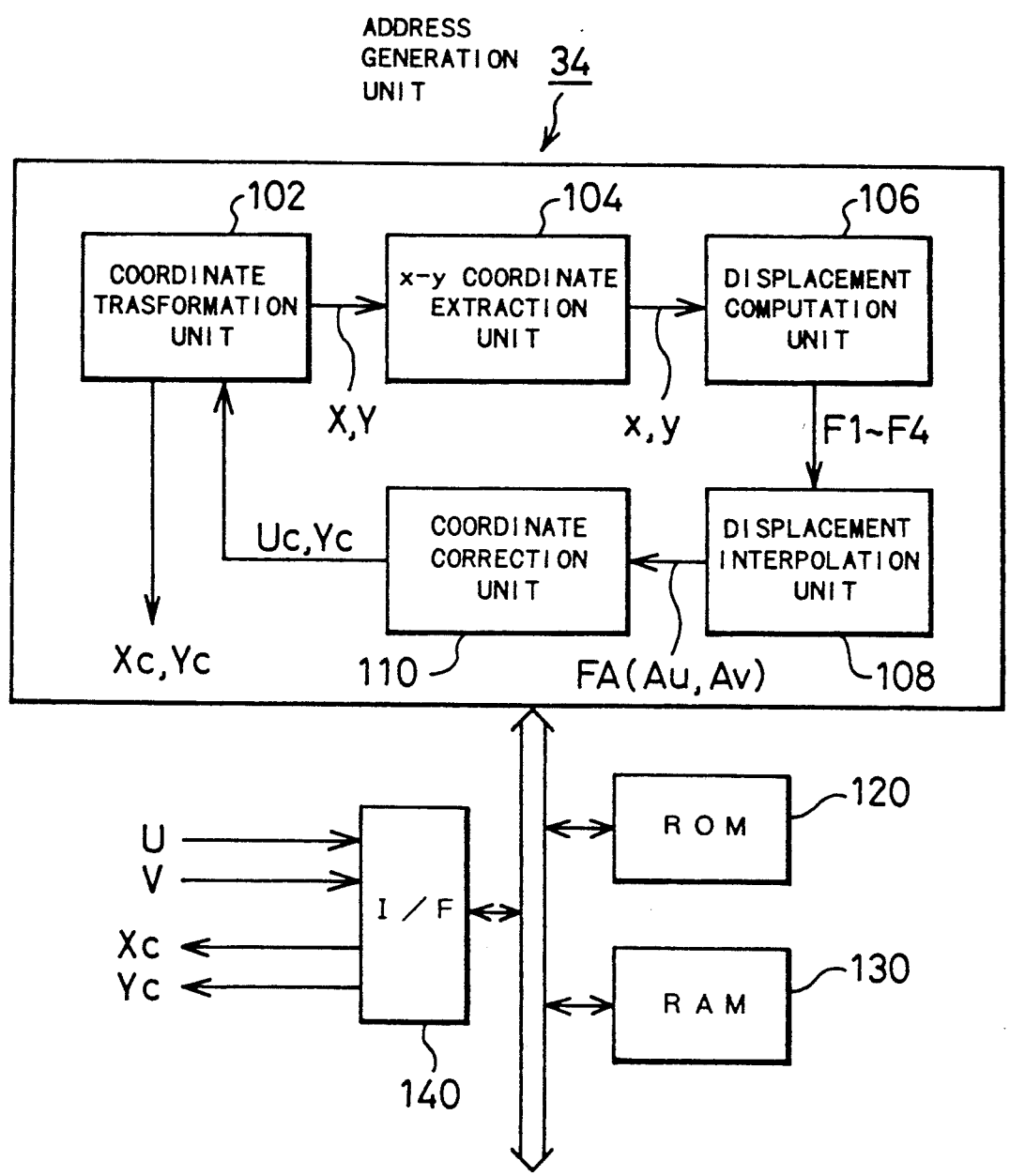
FIG. 14 is a block diagram showing the internal structure of an address generation unit 34.

FIG. 14 is a block diagram illustrating the internal structure of the address generating unit 34. The address generation unit 34 comprises CPU 100, ROM 120, RAM 130, and an I/O interface 140. The CPU 100 performs the functions of a coordinate transformation unit 102, an x-y coordinate extraction unit 104, a displacement computation unit 106, a displacement interpolation unit 108, and a coordinate correction unit 110. These units in the CPU 100 are implemented by software programs memorized in the ROM 120 to execute the procedure shown in FIG. 11.

Figure 15:
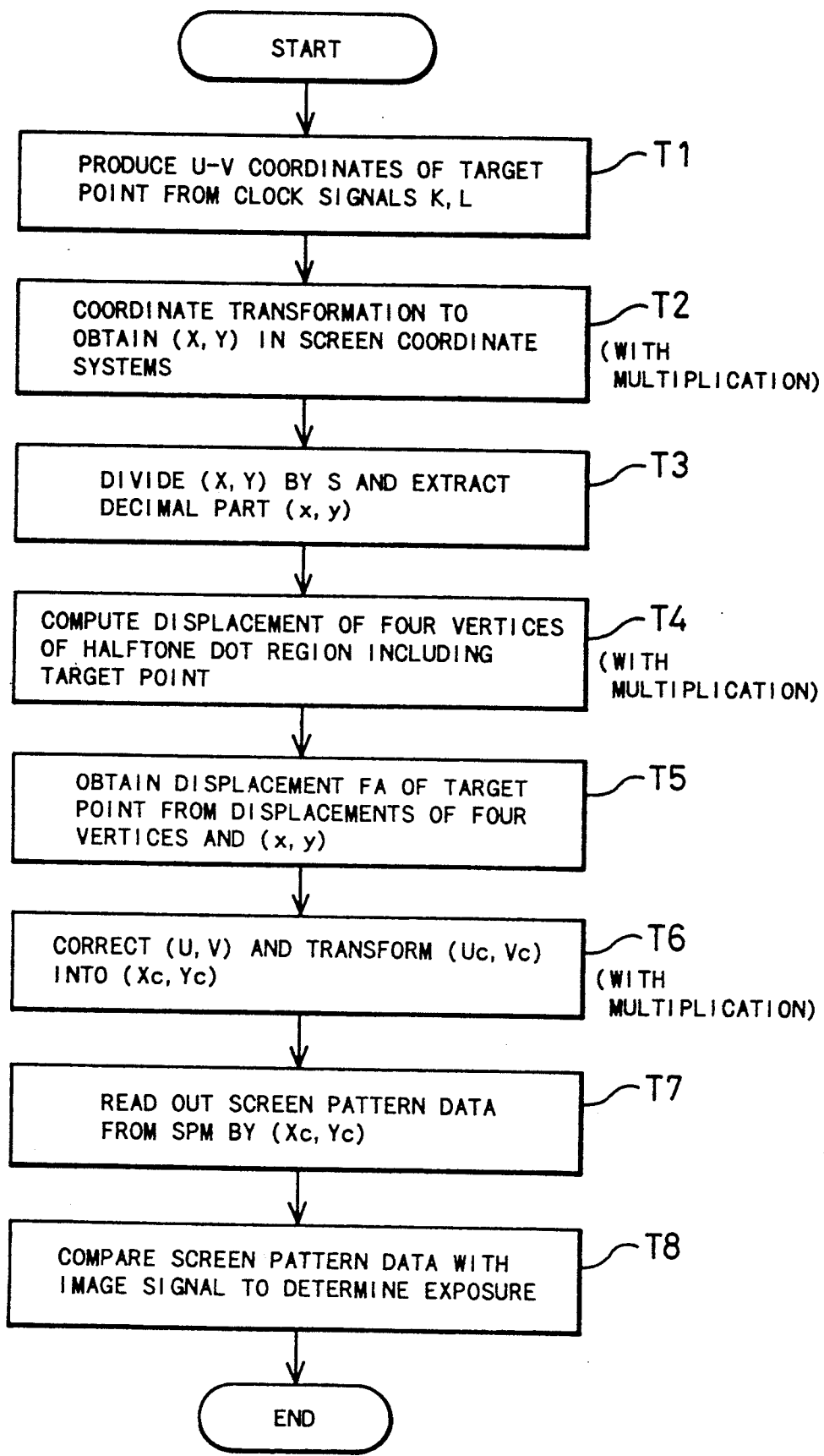
FIG. 15 is a flow chart showing the procedure of image recording in the first embodiment of the present invention.

FIG. 15 is a flow chart showing the procedure of image recording in the first embodiment of the present invention. At step T1, the film coordinate generation unit 33 produces coordinates (U, V) of the target lattice point A shown in FIG. 9 from the clock signals K and L.

At step T2, the address conversion unit 102 performs the coordinate transformation according to Equations (2a) and (2b) to convert the scanning coordinates (U, V) into the screen coordinates (X, Y).

At step T3, the x-y coordinate extraction unit 104 divides the coordinates (X, Y) by a side length of a halftone dot region S, and extracts the decimal fraction parts from the results of the division to obtain the coordinates (x, y).

At step T4, the displacement of the four vertices of the halftone dot region which includes the target point A are calculated. This operation is performed by the displacement computation unit 106 according to Equations (4a) through (11b).

At step T5, The displacement interpolation unit 108 interpolates the displacement of the four vertices according to Equations (12a) and (12b) to thereby obtain the displacement FA(AU, Av) of the target point A.

At step T6, the coordinate correction unit 110 corrects the U-V coordinates of the target point A according to Equations (13a) and (13b) to make the corrected coordinates (Uc, Vc), and the coordinate transformation unit 102 re-transforms the corrected scanning coordinates (Uc, Vc) into the screen coordinates (Xc, Yc). The coordinate transformation from the scanning coordinates (Uc, Vc) into the screen coordinates (Xc, Yc) is performed according to Equations (1a) and (1b) or Equations (2a) and (2b).

In the coordinate transformation, one halftone dot region is divided into the N-th power of 2, and the address is expressed in (M+N) bits, where N denotes an integral number part and M denotes a decimal fraction part. The higher N bits of the address values Xc and Yc are used to read out the screen pattern data. In this embodiment, the halftone dot region shown in FIG. 1 is divided into $2^5$ times $2^5$, or 32×32, and this means that N is equal to five. The address (Xc, Yc) is computed in the predetermined number of bits not less than five bits (for example, 32 bits).

Details of the coordinate transformation are described in U.S. Pat. Nos. 4,673,971, 4,543,613, and 4,499,489, the disclosure of which is herein incorporated by reference.

At step T7 in FIG. 15, The higher 5 bits of the 32 bit address are supplied from the address generation unit 34 to the screen pattern memory 35.

At step T8, the comparator 32 compares the screen pattern data and the image signal to determine whether the target point is exposed or not, to thereby produce the exposure-control signal Ps.

In the above procedure, multiplication is included in the coordinate transformation at steps T2, the computation of the displacement of step T4, and the coordinate transformation at step T6. Since multiplication requires more time than addition or subtraction, it is desirable to reduce the number of multiplication as much as possible.

In a second embodiment of the present invention described below, the multiplication is omitted in obtaining the displacement at step T4 by preparing the displacement of vertices of each halftone dot region in advance and memorizing them in RAM 130 or ROM 120.

FIG. 16 shows a displacement table prepared in the second embodiment of the present invention. The displacement table DT includes displacement $\Delta u$ and $\Delta v$ at an address defined by the integral number part (Ix, Iy) given by Equations (3a) and (3b). The integral number part (Ix, Iy) represents a vertex at the upper left of the halftone dot region which includes the target point A. The displacement of the four vertices of the halftone dot region are given by $\&u(Ix, Iy)$, $\Delta u(Ix+1, Iy)$, $\Delta u(Ix, Iy+1)$, and $\Delta u(Ix+1, Iy+1)$ in the primary scanning direction, and by $\Delta v(Ix, Iy)$, $\Delta v(Ix+1, Iy)$, $\Delta v(Ix, Iy+1)$, and $\Delta v(Ix+1, Iy+1)$ in the secondary scanning direction.

Figure 17:
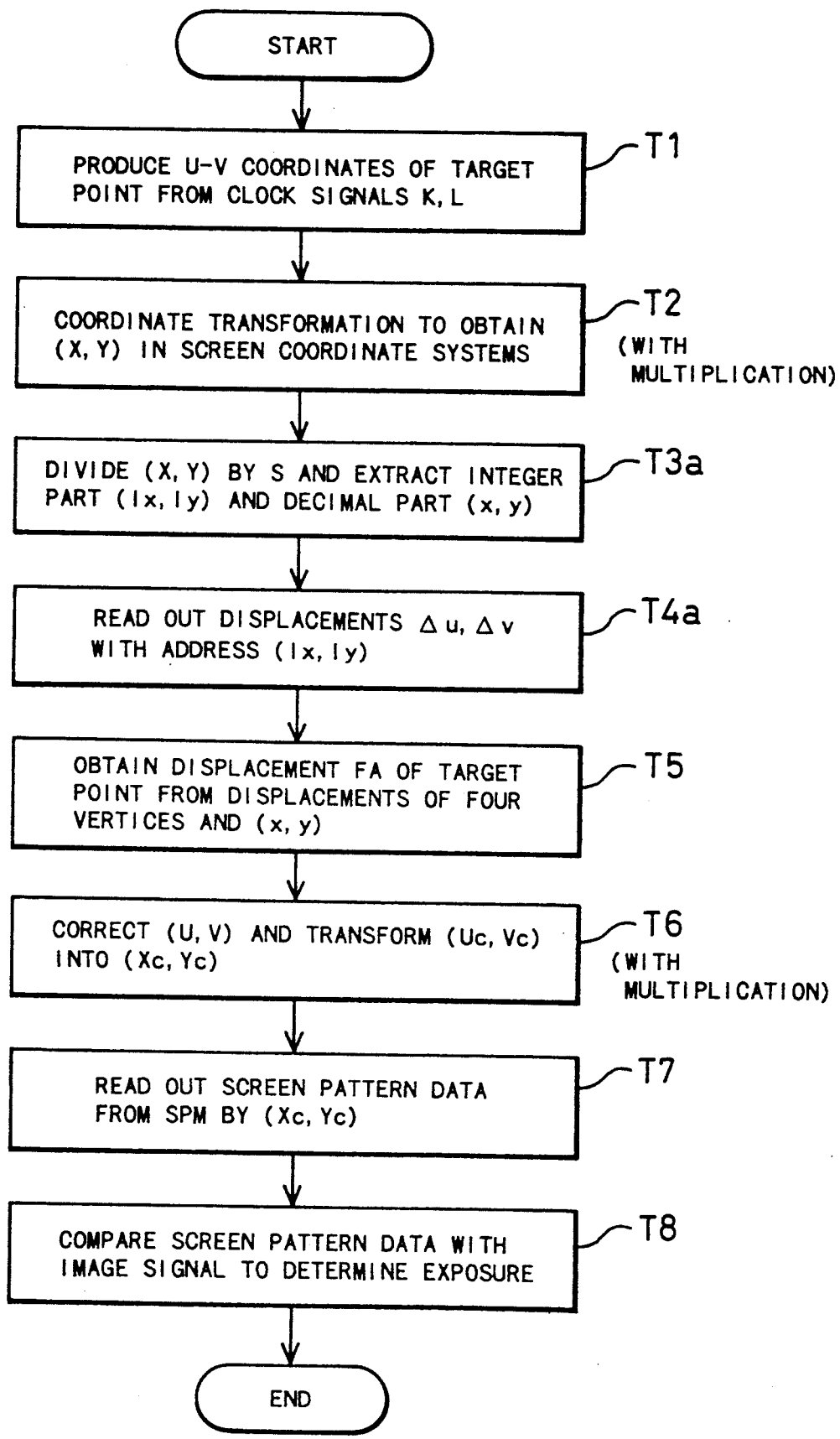
FIG. 17 is a flow chart showing the procedure of the second embodiment.

FIG. 17 is a flow chart showing the procedure of the second embodiment of the present invention. The procedure of FIG. 17 is the same as that of FIG. 15 except steps T3a and T4a.

At step T3a, the coordinates (X, Y) of the target point A are divided by the side length of a halftone dot region S to obtain the integral number part (Ix, Iy) as well as the decimal fraction part (x, y).

At step T4a, the displacement $\Delta u$ and $\Delta v$ of the four vertices of the halftone dot region are read out from the displacement table DT while addressing the table with the integral number part (Ix, Iy).

The procedure of FIG. 17 does not require multiplication in obtaining the displacement $\Delta u$ and $\Delta v$ at step T3a. The number of multiplication is therefore reduced by one from the procedure of FIG. 15, and this decreases the overall processing time.

FIG. 18 shows a displacement table prepared in a third embodiment of the present invention. In the third embodiment, the displacement vector is expressed in the X-Y coordinate systems in advance, and the number of multiplication is further reduced from the second embodiment accordingly.

While the displacement ($\Delta u$, $\Delta v$) is expressed in the U-V coordinate systems as shown in FIG. 16 in the second embodiment described above, the components ($\Delta u$, $\Delta v$) are transformed into components ($\Delta x$, $\Delta y$) of the X-Y coordinate systems according to Equations (2a) and (2b) in advance in the third embodiment. The displacement ($\Delta x$, $\Delta y$) are then registered in the displacement table DTa shown in FIG. 18.

Figure 19:
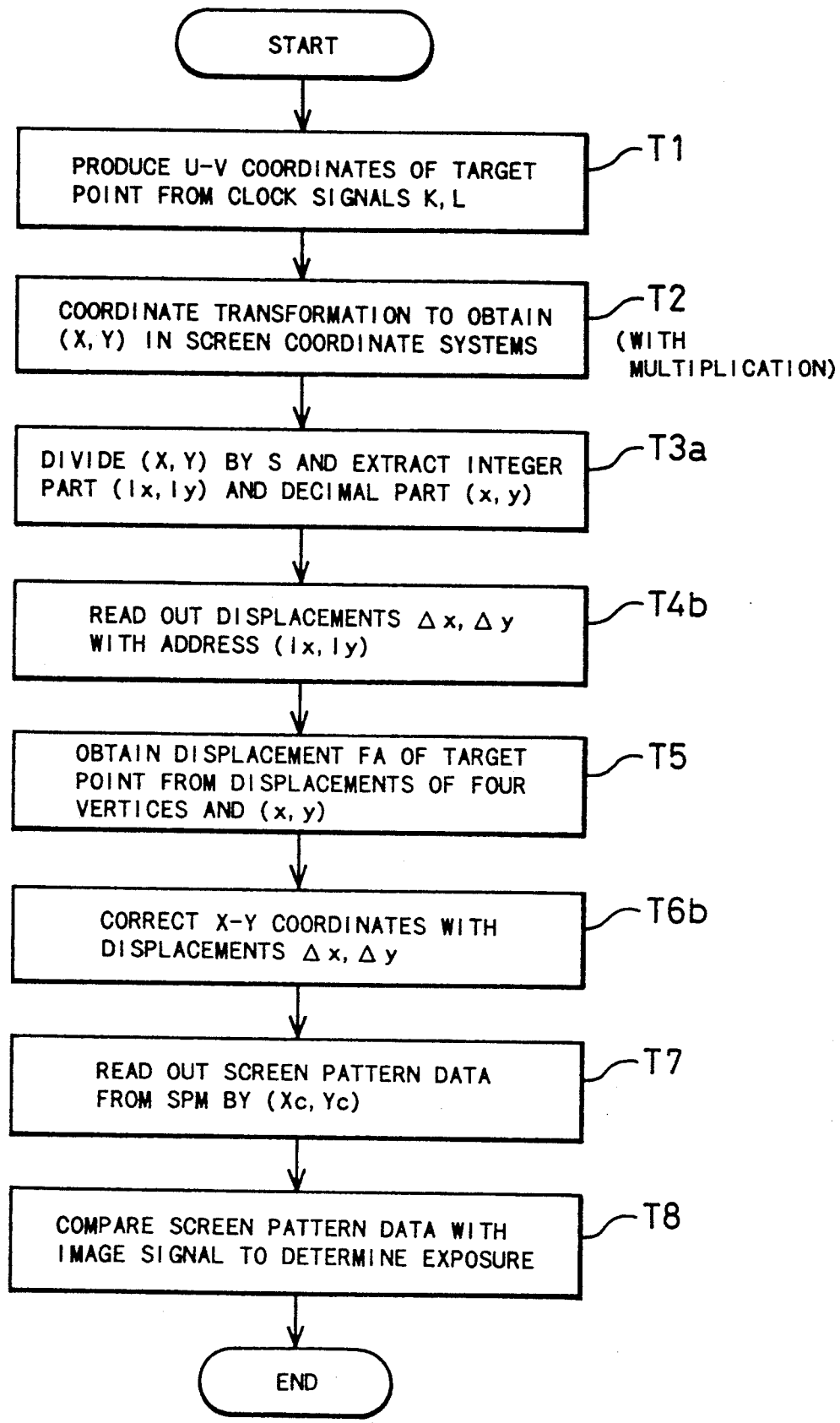
FIG. 19 is a flow chart showing the procedure of the third embodiment.

FIG. 19 is a flow chart showing the procedure of the third embodiment. The procedure of FIG. 19 is the same as that of FIG. 17 except steps T4b and T6b.

At step T4b, the displacement Dx and Dy of the four vertices of the halftone dot region are read out from the displacement table DTa while addressing the table with the integral number part (Ix, Iy).

At step T6b, the X-Y coordinates of the target point A is corrected by:

$$Xc = X - \Delta x \quad (14a)$$

$$Yc = Y - \Delta y \quad (14b)$$

This correction is equivalent to the correction of Equations (13a) and (13b).

Since the operation at step T6b is addition but not multiplication, the number of multiplication operations is reduced by one from the procedure of FIG. 17 to further decrease the overall processing time.

Figure 20:
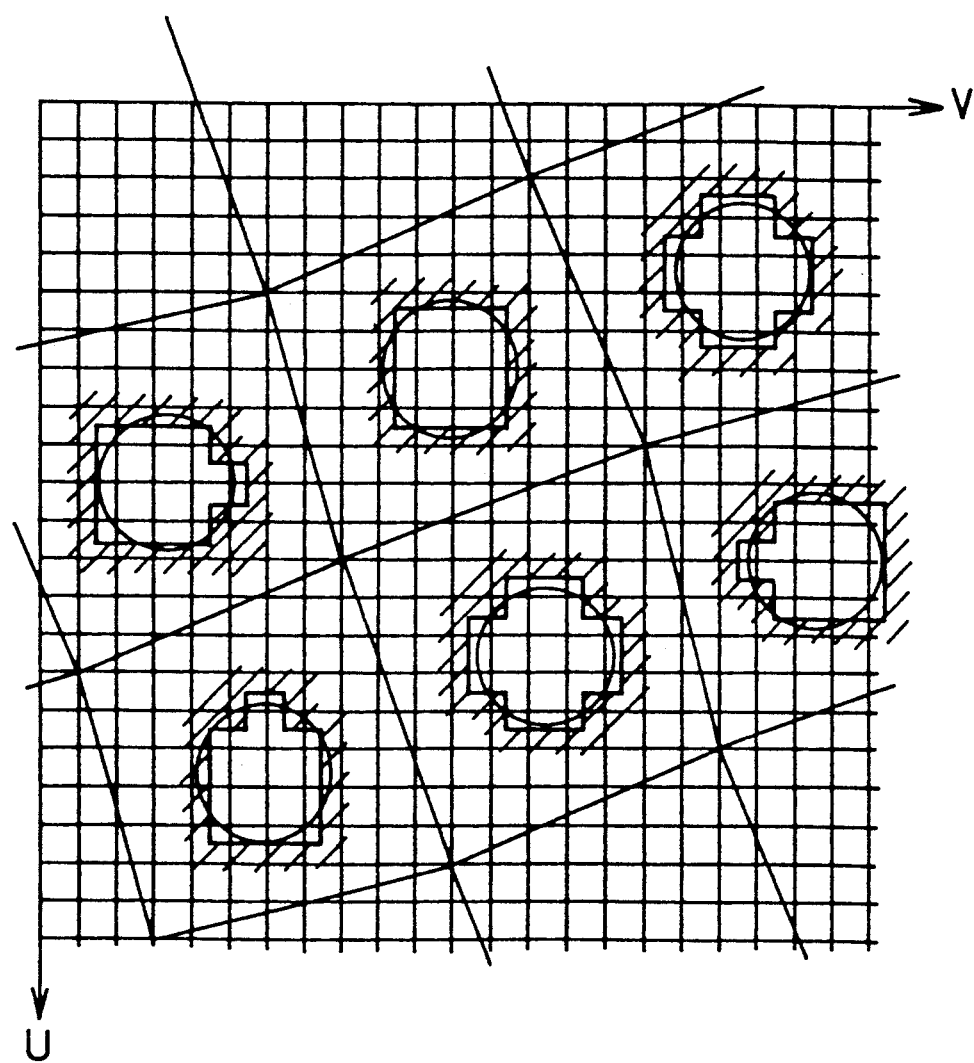
FIG. 20 illustrates shapes of halftone dots in a shadow area.

Each of the first through third embodiments forms the halftone dots shown in FIG. 12 where the fluctuations in size and shape of halftone dots is suppressed. When the halftone dots become large enough due to a high halftone-dot area rate, as shown in FIG. 20, the large halftone dots make circular white areas, or blank areas, around the centers of the halftone dot regions. The white area shows fluctuations in size and shape because the centers of the halftone dot regions is not located right at the lattice points of the scanning coordinate systems.

Figure 21:
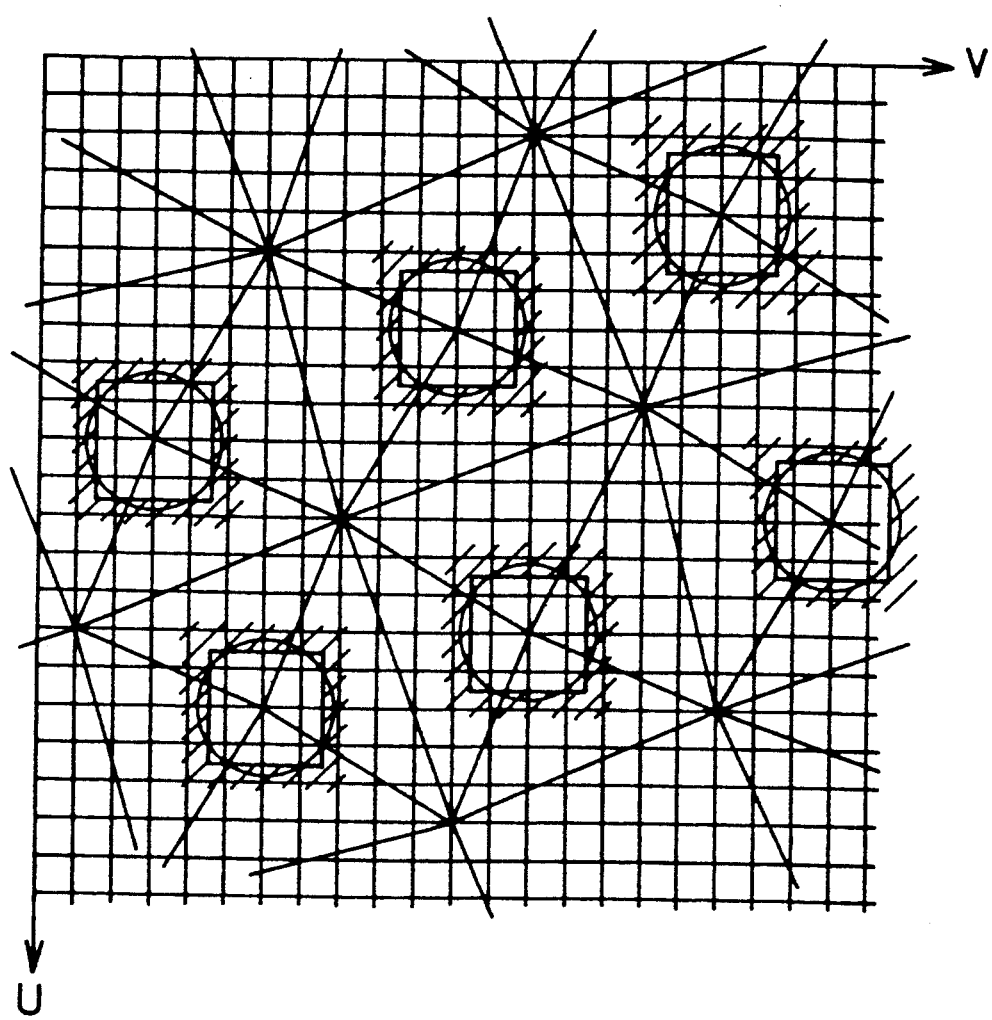
FIG. 21 illustrates halftone dots which are formed when the centers of the halftone dot regions are positioned at the lattice points of the scanning coordinate systems.

A fourth embodiment of the present invention is improved from the first through third embodiments in that the center of each halftone dot region is positioned at a lattice point of the scanning coordinate systems. FIG. 21 illustrates halftone dots of a large size which are formed according to the fourth embodiment, where the fluctuation in size and shape of the white areas are suppressed.

Figure 22:
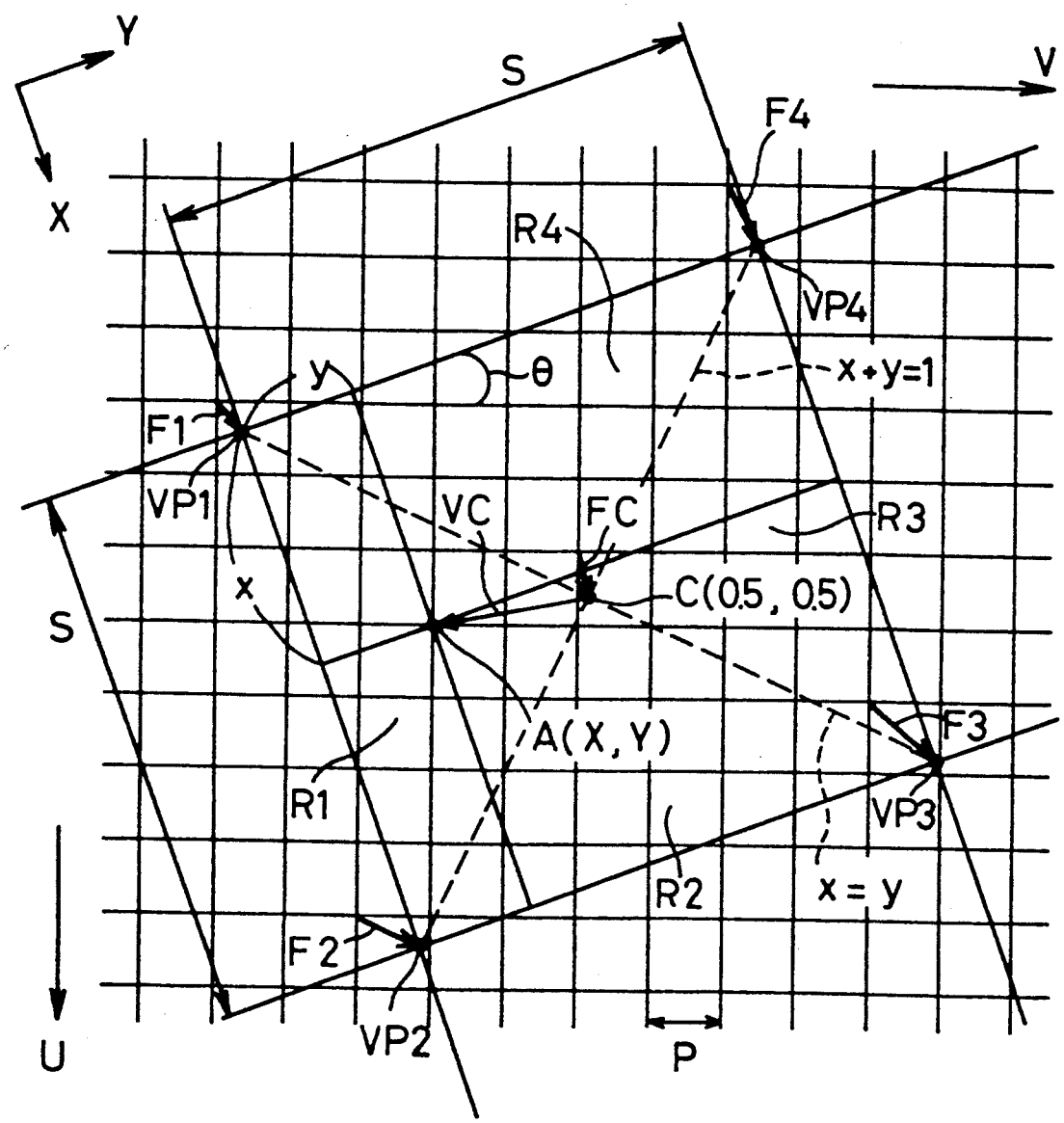
FIG. 22 shows displacement of the center of a halftone dot region.

In order to dispose the center of each halftone dot region at a lattice point of the scanning coordinate systems, displacement of the center of each halftone dot region is required first. FIG. 22 illustrates displacement of the center of a halftone dot region FC.

The x-y coordinates of the center C are (0.5, 0.5), and its displacement FC(uc, vc) from the lattice point at its upper left is given as follows:

$$uc = INT[FUc+1] - FUc \quad (15a)$$

$$vc = INT[FVc+1] - FVc \quad (15b)$$

$$FUc = \{(x-0.5)\cos\theta - (y-0.5)\sin\theta\}/p \quad (16a)$$

$$FVc = \{(x-0.5)\sin\theta + (y-0.5)\cos\theta\}/p \quad (16b)$$

where FUc and FVc are components of a vector VC shown in FIG. 21 which is directed from the center C to the target lattice point A.

The displacement of the arbitrary target point A (X, Y) is computed according to a Three-point Interpolation Method, which will be described later in detail, on the basis of the displacement FC of the center C and displacement of two vertices near the lattice point A.

The two vertices near the lattice point A are selected from the four vertices VP1 through VP4 of the halftone dot region as follows. The halftone dot region is divided into four triangle regions R1 through R4 by two diagonals as shown in FIG. 22. The diagonal connecting VP1 and VP3 is expressed by x=y, and the diagonal connecting VP2 and VP3 by x+y−1. If the target lattice point A is included in the triangle region R1, as shown in FIG. 22, the displacement of the target point A is interpolated from those of the vertices C, VP1 and VP2 of the triangle region R1.

The triangle region which includes the target point A is determined on the basis of the x-y coordinates of the target point A as follows:

$x \geq y$ and $x+y < 1$: Target point A is included in R1

$x \geq y$ and $x+y \geq 1$: Target point A is included in R2

$x < y$ and $x+y > 1$: Target point A is included in R3

$x < y$ and $x+y < 1$: Target point A is included in R4

Figure 23:
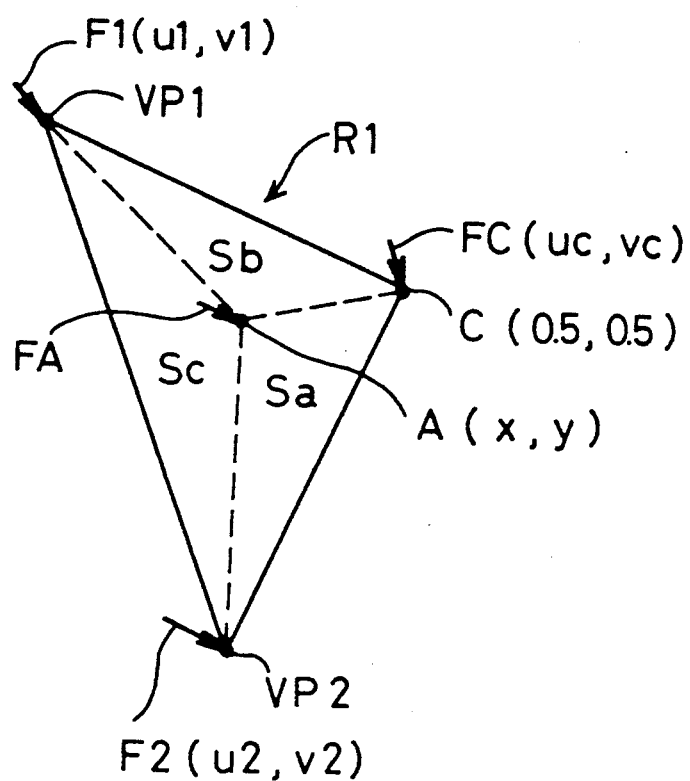
FIG. 23 is a schematic diagram showing Three-point Interpolation Method.

FIG. 23 is a schematic diagram showing the Three-point point Interpolation Method. The triangle region R1 including the target point A is divided into three subtriangles with straight lines which connects the target point A and the three vertices of the triangle region R1. The displacement FA of the target point A is obtained by adding displacement F1(u1, v1), F2(u2, v2), and FC(uc, vc) of the three vertices VP1, VP2, and C, respectively, while weighing them with the areas Sa, Sb, and Sc of the respective sub-triangles. The components (Au, Av) of the displacement FA at the target point A is therefore given as follows:

$$Au = u1 \cdot Sa + u2 \cdot Sb + uc \cdot Sc \quad (17a)$$

$$Av = v1 \cdot Sa + v2 \cdot Sb + vc \cdot Sc \quad (17b)$$

where the areas of the sub-triangles Sa, Sb, and Sc are calculated from the coordinates (x, y) of the points A, C, VP1, and VP2. The displacement FA of the target point A can be computed in the similar manner when the target point A is included in the other regions R2, R3, and R4.

The halftone dots are formed according to either of the flow charts shown in FIGS. 15, 17, and 19 when the center C of each halftone dot region is positioned at a lattice point of the scanning coordinate systems.

Figure 24:
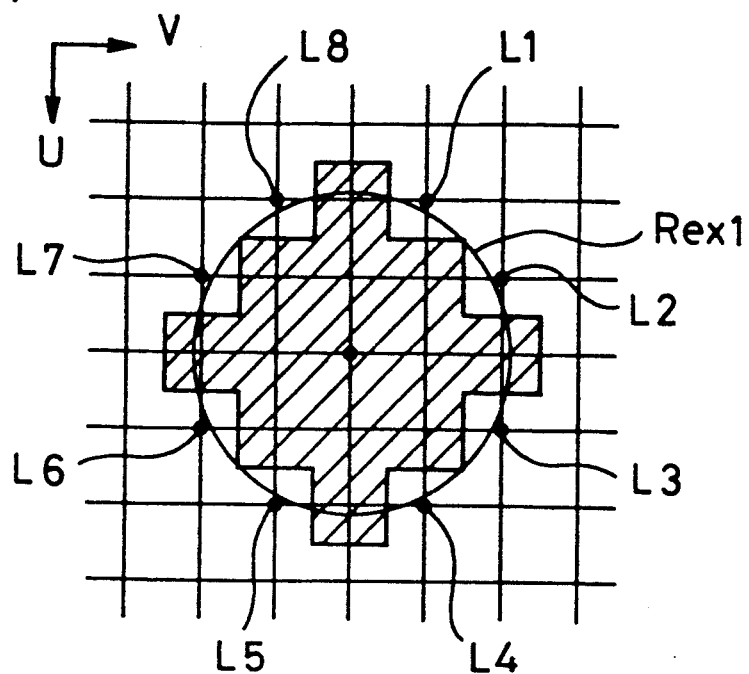
FIGS. 24A and 24B show the stepwise change of halftone dot area due to a small change of image signal.
Figure 24:
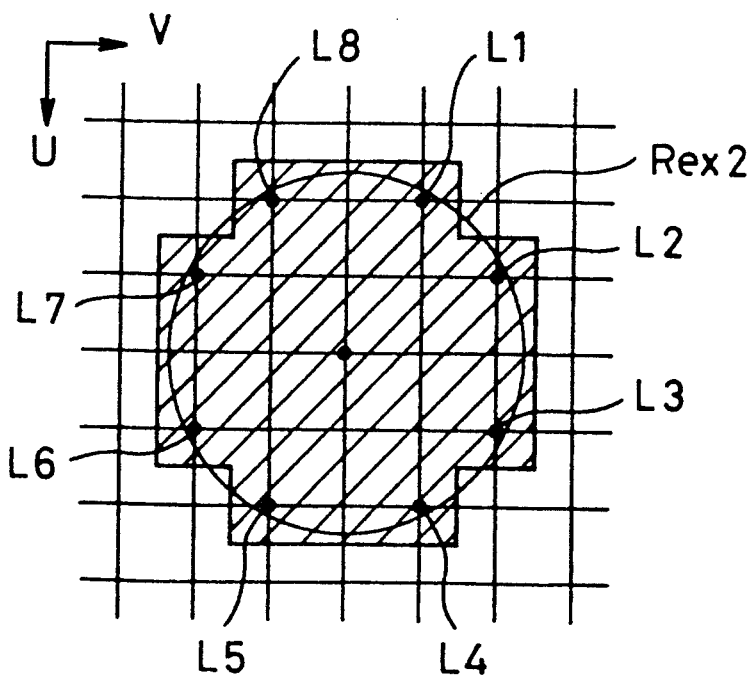

In the fourth embodiment described above, the fluctuations in size and shape of the halftone dots are suppressed both in a light image area (FIG. 12) and in a dark image area (FIG. 21). However, the size of halftone dots may vary abruptly in response to a small change of an image signal in some cases. FIGS. 24A and 24B show stepwise change in size of halftone dots due to a small change of the image signal. A circular region Rex1 shown in FIG. 24A indicates a region where the screen pattern data is less than an image signal, and the pixels disposed at its lattice points within the region Rex1 are exposed, which are shaded in FIG. 24A. Since lattice points L1 through L8 are just outside the region Rex1, the pixels at those lattice points L1 through L8 are not exposed.

In FIG. 24B, the level of the image signal becomes a little higher than that shown in FIG. 24A, and the circular region Rex2 is expanded from the region Rex1 accordingly. Since the lattice points L1 through L8 are included in the expanded circular region Rex2, the pixels at those lattice points L1 through L8 are exposed in FIG. 24B. As a result, the halftone dot is also expanded by eight pixels. If the level of the image signal further increases a little from that of FIG. 24B, the number of pixels constituting the halftone dot remains. Since the positional relation between the U-V coordinates and the X-Y coordinates is almost constant all over the image, if one halftone dot is enlarged by eight pixels, the other halftone dots in the vicinity are also enlarged by eight pixels. This makes a jump in gradation levels of the image.

The reason why such abrupt change in halftone dot area is caused by a small change in the level of image signal is because the centers of the halftone dots, or the vertices of the halftone dot regions, are positioned at the lattice points of the scanning coordinate systems. Since the scanning coordinate systems is symmetric with respect to any straight line which is parallel to one of the coordinate axes and which is drawn through lattice points, the pixels which are symmetric with each other with respect to the lattice point at the center of the halftone dot is simultaneously exposed or not exposed.

Figure 25:
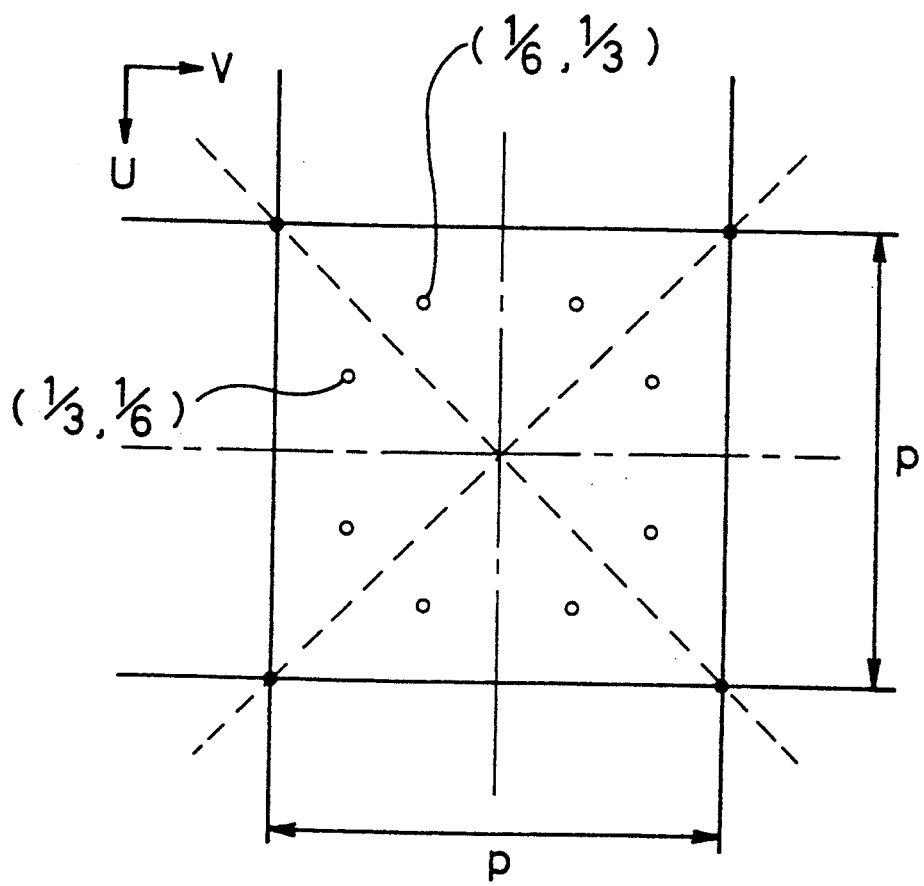
FIG. 25 shows desirable positions for an origin of halftone dot regions.

In a fifth embodiment of the present invention, the corrected X-Y coordinates of the vertices of the halftone dot, which are corrected according to either of the first through fourth embodiments, are shifted by a predetermined distance from a lattice point of the scanning coordinate systems to prevent the gradation jump. FIG. 25 shows desirable positions of a reference point of a halftone dot region in the fifth embodiment. Solid lines are grid lines of the scanning coordinate systems, and broken lines and dashed lines are other symmetric axes. All of the solid lines, the broken lines, and the dashed lines are symmetric axes in the scanning coordinate systems. In order to prevent the gradation jump, it is preferred to locate the vertices of halftone dot regions as distant from the symmetric axes as possible. The blank circles shown in FIG. 25 show preferable positions of vertices of the halftone dot region, and they are at the centers of gravity of respective triangles which are formed by the symmetric axes. The blank circles are distant from any symmetric axis consequently. The bland circles have the scanning coordinates, or U-V coordinates, of ($\frac{1}{6}$, 1/6), (1/6, $\frac{1}{6}$), for example.

Figure 26A:
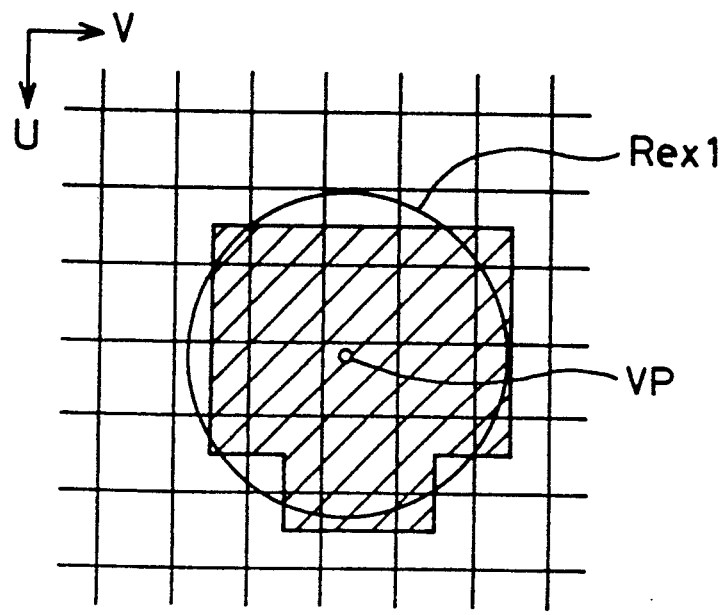
FIGS. 26A and 26B show halftone dots which are formed when a vertex of a halftone dot region is located at (1/6, ⅓)
Figure 26B:
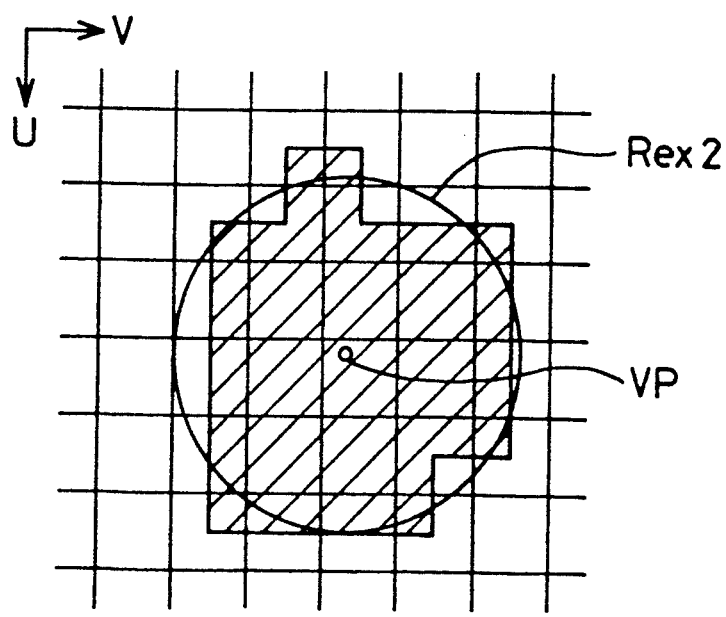

FIGS. 26A and 26B show halftone dots which are formed when a vertex of a halftone dot region is located at a position VP, which corresponds to the position of (1/6, $\frac{1}{6}$) shown in FIG. 25. FIGS. 26A and 26B correspond to FIG. 24A and 24B where only the position of the vertex of the halftone dot region is different. The halftone dot shown in FIG. 26B is larger than that shown in FIG. 26A by only two pixels, and thus the gradation jump shown in FIGS. 24A and 24B is suppressed.

In order to shift the vertices of the halftone dot regions by (1/6, $\frac{1}{6}$), the corrected scanning coordinates (Uc, Vc) obtained at step T6 shown in FIGS. 15 and 17 are added with (1/6, $\frac{1}{6}$). In the procedure shown in FIG. 19, the displacement table shown in FIG. 18 is prepared by transforming ($\Delta u + 1/6$, $\Delta v + \frac{1}{6}$) into ($\Delta x$, $\Delta y$) instead of transforming ($\Delta u$, $\Delta v$) into ($\Delta x$, $\Delta y$).

The present invention is not limited to the above embodiments, but it can be modified as follows.

(1) Instead of positioning the four vertices of a halftone dot at lattice points of the scanning coordinate systems, the center of the halftone dot region can be positioned at a lattice point of the scanning coordinate systems. The displacement of the center of the halftone dot region is obtained according to Equations (15a), (15b), (16a), and (16b).

Figure 27:
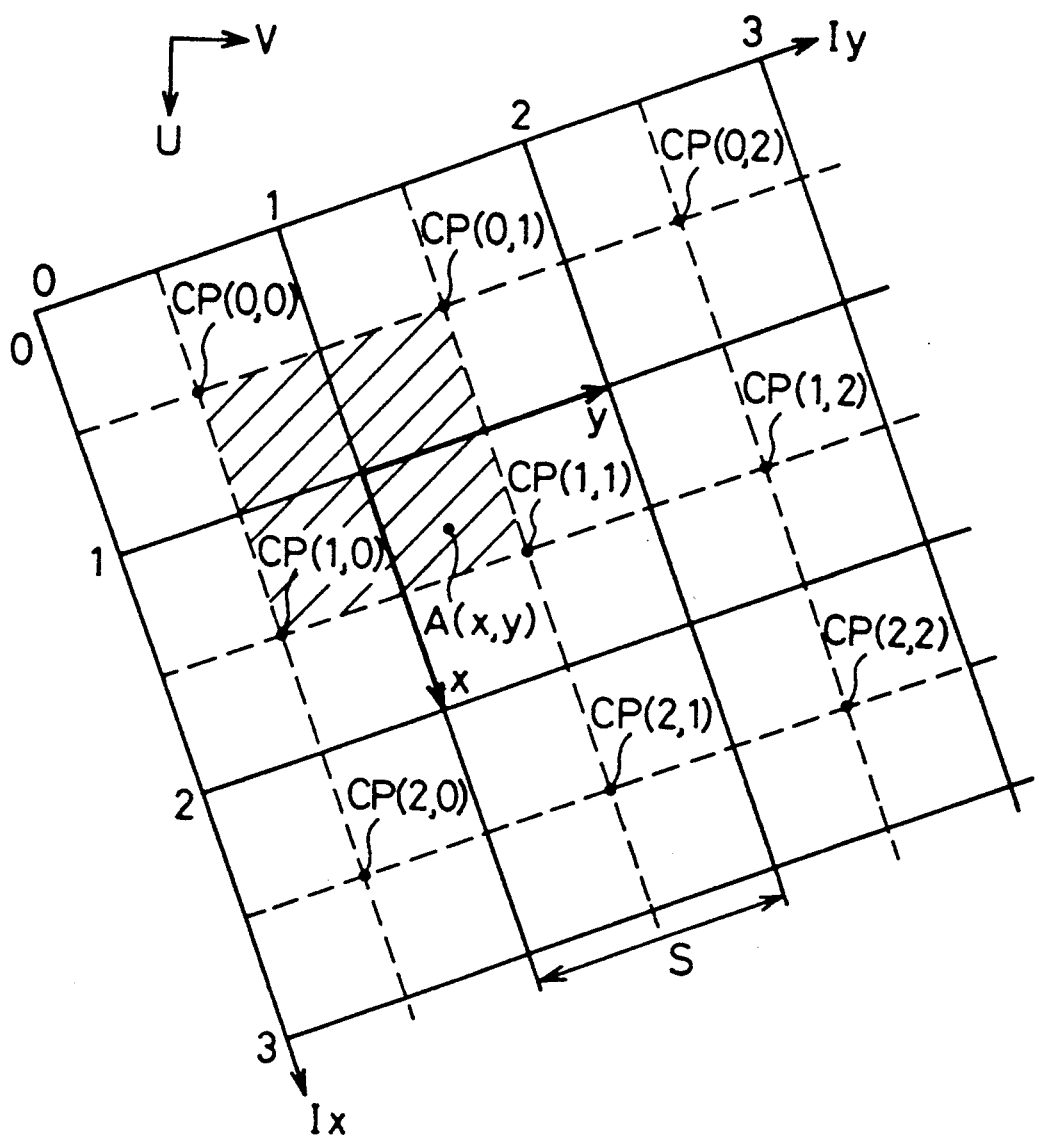
FIG. 27 shows four central points which are referred in interpolation while only the centers of the halftone dot regions are positioned at the lattice points of the scanning coordinate systems.

The displacement of the arbitrary lattice point A is interpolated by the Four-point Interpolation Method when only the centers of the halftone dots are positioned at lattice points of the scanning coordinate systems. FIG. 27 shows four central points which are referred to in interpolation in this case. Suppose that the lattice point A is included in the halftone dot region which has a center CP (Ix, Iy), the four centers which are referred to in interpolating the displacement of the lattice point A(x, y) are determined as follows:

If x≦0.5 and y≦0.5:CP(Ix−1, Iy−1), CP(Ix−1, Iy), CP(IX, Iy−1), and CP(IX, Iy)

If x≦0.5 and y>0.5:CP(Ix−1, Iy), CP(Ix−1, Iy+1), CP(Ix, Iy+1), and CP(IX, Iy)

If x>0.5 and y<0.5:CP(Ix, Iy−1), CP(IX+1, Iy−1), CP(Ix+1, Iy), and CP(IX, Iy)

If x>0.5 and y>0.5:CP(Ix, Iy+1), CP(Ix+1, Iy), CP(Ix+1, Iy+1), and CP(IX, Iy)

Since FIG. 27 holds the condition "x≦0.5 and y≦0.5", the four centers to be referred to are CP(0, 0), CP(0, 1), CP(1, 0), and CP(1, 1); the displacement of the lattice point A is interpolated from the displacement of these four centers. Displacement of any lattice point within the shaded region in FIG. 27 is interpolated from the displacement at those four points.

Figure 28:
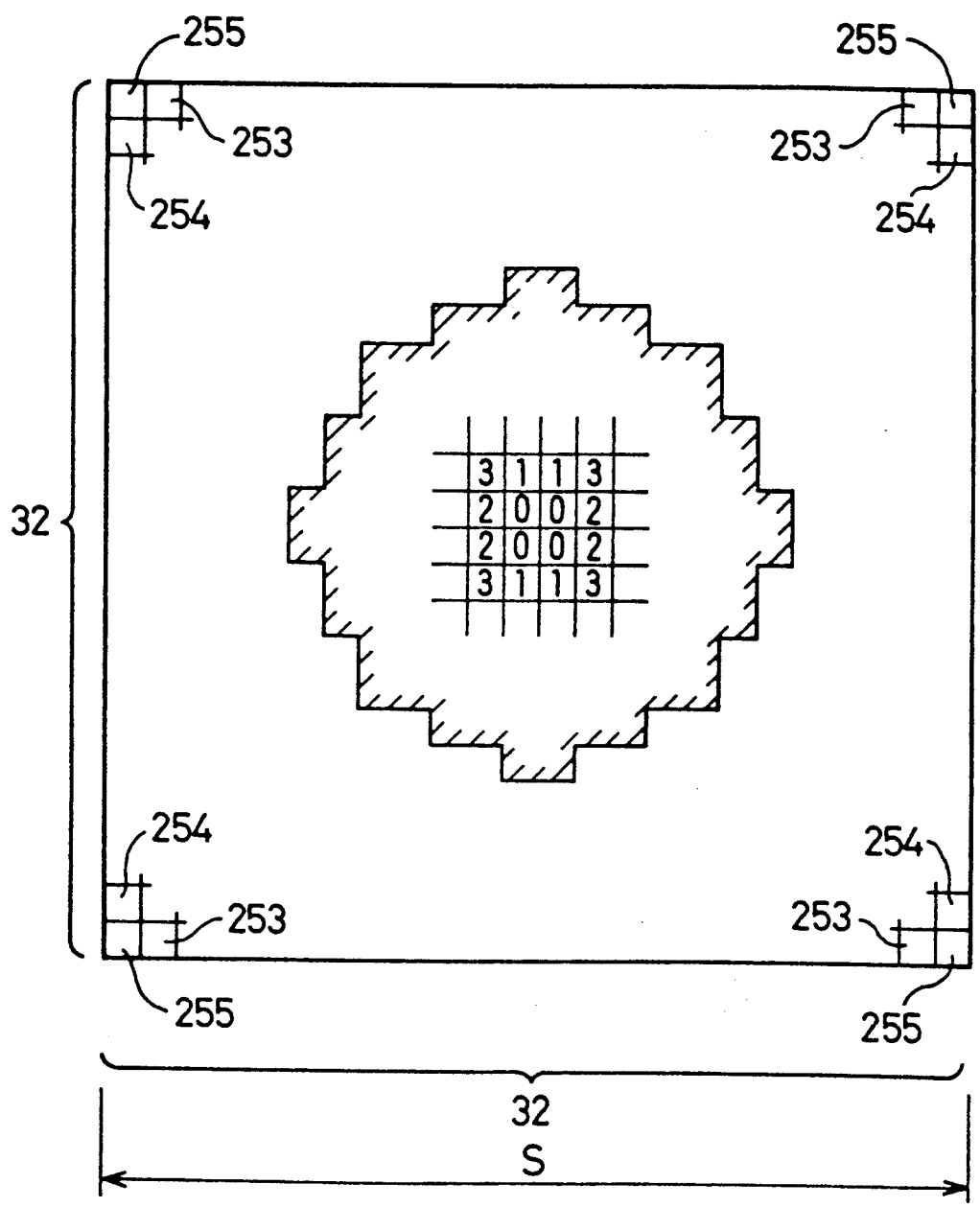
FIG. 28 illustrates another example of screen pattern data.

The fluctuations in size and shape of halftone dots can be reduced in the similar manner as in the first through third embodiments of the present invention even if only the centers of the halftone dot regions are positioned at the lattice points of the scanning coordinate systems as described above. In this case, another screen pattern as shown in FIG. 28 can be used in place of that shown in FIG. 1. The screen pattern shown in FIG. 28 has relatively small values in the center and relatively large values at the periphery. The screen pattern data shown in FIG. 28 can be also applied to the first through fourth embodiments.

In general, the fluctuations in size and shape of halftone dots can be suppressed by using the screen pattern data which has a maximum value or a minimum value at a predetermined reference point in a halftone dot region while the reference point is positioned at a lattice point of the scanning coordinate systems. The reference point can be any predetermined point in the halftone dot region such as the center or one of the vertices of the halftone dot region.

Figure 29:
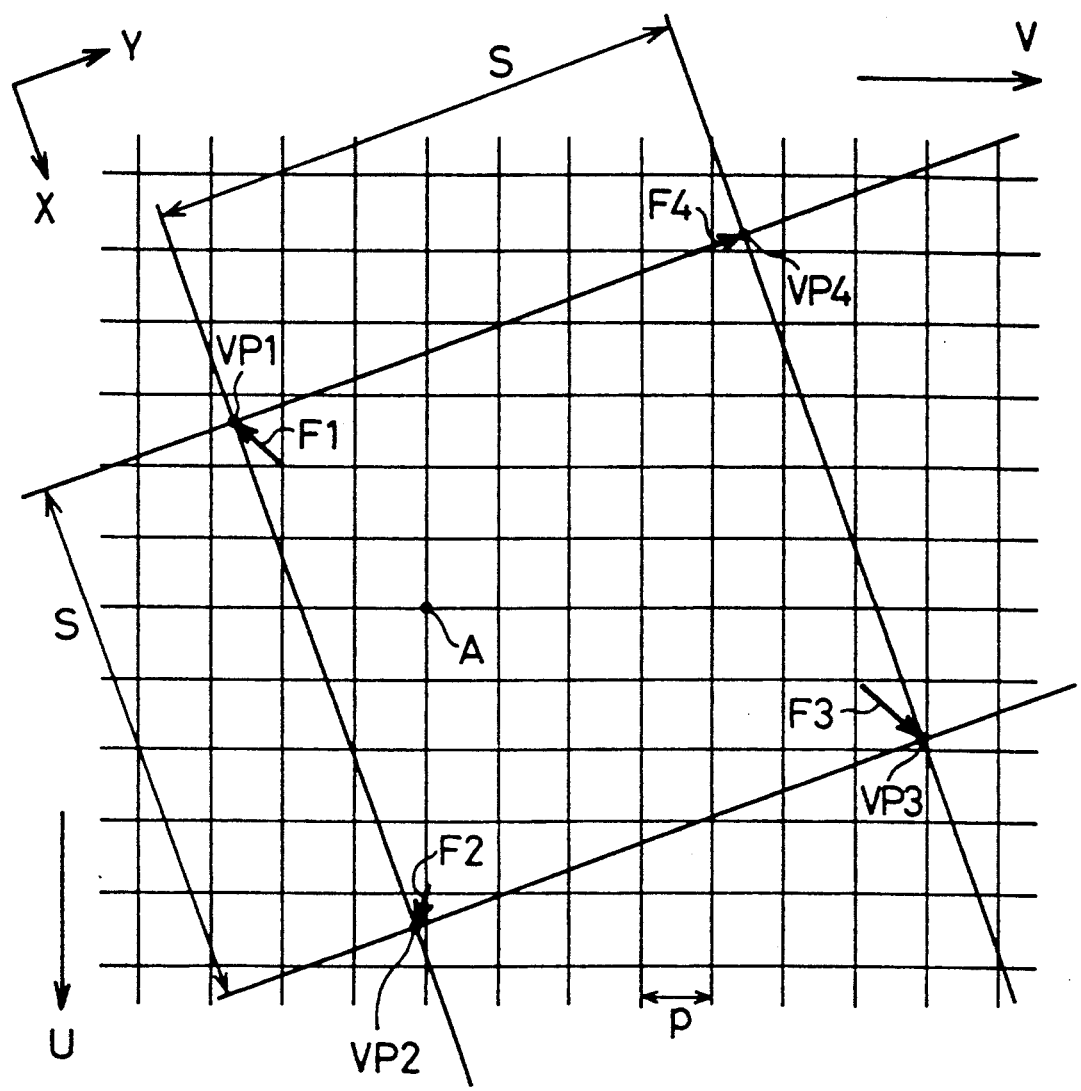
FIG. 29 illustrates another example of displacement vectors.

(2) In FIG. 9, each of the displacement vectors F1 through F4 at the respective four vertices VP1 through VP4 is defined as one directed from an upper-left lattice point of the vertex to the vertex itself, and the components of the vectors are given by Equations (5a) and (5b). The displacement vector, however, can be defined as one directed from any one of the four lattice point around the vertex to the vertex itself. For example, the components of the displacement vector can be obtained by extracting the decimal fraction part of the values FU1 and FV1 given by Equations (4a) and (4b), and by changing the sign of the decimal fraction part. This makes the displacement vectors F1 through F4 shown in FIG. 29.

(3) The interpolation method is not limited to the Three-point- and the Four-point-Interpolation Method, but any interpolation method can be applied to obtain the displacement of the target lattice point A on the basis of displacement of plural reference points in the vicinity of the target lattice point A.

(4) Although the functions of the units 102, 104, 106, 108, and 110 in the address generation unit 34 shown in FIG. 14 are carried out by software programs in the above embodiments, those units can be implemented by hardware circuits.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of generating halftone dots each consisting of a plurality of pixels as a function of given image signals, comprising the steps of:
   (a) preparing a screen pattern memory for storing a plurality of threshold values arranged in each of matrices laid out in Cartesian X-Y coordinate systems, each of said matrices including at least one reference point which has an extreme of said plurality of threshold values;
   (b) arranging said pixels at lattice points in Cartesian U-V coordinate systems, said U and V denoting a primary scanning direction and a secondary scanning direction, respectively, said U-v coordinate systems being set in predetermined relation to said X-Y coordinate systems;
   (c) obtaining displacement of said reference point in each of said matrices from an lattice point of said U-V coordinate systems adjacent to said reference point;
   (d) obtaining X-Y coordinates of a target lattice point in said U-V coordinate systems while correcting said X-Y coordinates of said target lattice point with displacement of said target lattice point interpolated from said displacement of a plurality of said reference points, said plurality of said reference points existing in the vicinity of said target lattice point;
   (e) addressing said screen pattern memory by said corrected X-Y coordinates to thereby read out said threshold value for said target lattice point; and
   (f) comparing said threshold value for said target lattice point and said given image signal to determine whether or not to expose a pixel at said target lattice point.

2. A method in accordance with claim 1, wherein a position of said reference point in said X-Y coordinate systems is expressed by an integral number part of said X-Y coordinates while said position of said reference point within each of said matrices is expressed by a decimal fraction part of said X-Y coordinates, and said plurality of said reference points referred to at said step (d) are represented by rounded values of said X-Y coordinates of said target lattice point.

3. A method in accordance with claim 2, wherein said step (c) comprises the steps of:
   calculating said displacement of said reference point in each of said matrices with respect to each set of integral coordinates of said X-Y coordinates systems; and
   storing said displacement with respect to said each set of integral coordinates of said X-Y coordinate systems in a memory; and wherein said step (d) comprises the step of:
   reading out said displacement of said plurality of said reference points by said rounded values of said X-Y coordinates of said target lattice point.

4. A method in accordance with claim 3, wherein said displacement stored in said memory is expressed in said U-v coordinate systems.

5. A method in accordance with claim 3, wherein said displacement stored in said memory is expressed in said X-Y coordinate systems.

6. A method in accordance with claim 1, wherein said at least one reference point in each of said matrices includes four corner points of each of said matrices.

7. A method in accordance with claim 1, wherein said at least one reference point in each of said matrices includes a center of each of said matrices.

8. A method in accordance with claim 1, wherein said step (d) comprises the step of:
   re-correcting said corrected X-Y coordinates of said target lattice point by a predetermined shift of position such that said reference point in each of said matrices is shifted to a predetermined position apart from symmetric axes of said U-v coordinate systems according to said predetermined shift.

9. An apparatus for generating halftone dots each consisting of a plurality of pixels as a function of given image signals, comprising:
   (a) a screen pattern memory for storing a plurality of threshold values arranged in each of matrices laid out in Cartesian X-Y coordinate systems, each of said matrices including at least one reference point which has an extreme of said plurality of threshold values;
   (b) coordinate signal generation means for generating a coordinate signal representing a position of a target lattice point in Cartesian U-V coordinate systems, said U and V denoting a primary scanning direction and a secondary scanning direction, respectively, said U-V coordinate systems being set in predetermined relation to said X-Y coordinate systems;
   (c) address generation means for generating an address for said screen pattern memory, comprising:
   coordinate transforming means for transforming said coordinate signal of said target lattice point from U-V coordinates into X-Y coordinates;
   displacement generation means for generating displacement with respect to a plurality of said reference points, said reference points existing in the vicinity of said target lattice point, said displacement being a distance from each of said plurality of said reference points to an lattice point of said U-V coordinate systems adjacent to each of said plurality of said reference points;
   interpolation means for interpolating said displacement of said plurality of said reference points to obtain displacement of said target lattice point; and
   coordinate correction means for correcting said X-Y coordinates of said target lattice point with said displacement of said target lattice point, to thereby obtain said address of said screen pattern memory corresponding to said coordinate signal; and
   (e) comparator means for comparing said given image signal and said threshold value for said target lattice point read out from said screen pattern memory by said address to generate an exposure signal indicating whether or not to expose a pixel at said target lattice point.

10. An apparatus in accordance with claim 9, wherein a position of said reference point in said X-Y coordinate systems is expressed by an integral number part of said X-Y coordinates while said position of said reference point within each of said matrices is expressed by a decimal fraction part of said X-Y coordinates, and said plurality of said reference points referred by said displacement generation means are represented by rounded values of said X-Y coordinates of said target lattice point.

11. An apparatus in accordance with claim 10, wherein said displacement generation means comprises:
   means for calculating said displacement with respect to each set of integral coordinates of said X-Y coordinates systems; and
   a memory for storing said displacement with respect to said each set of integral coordinates of said X-Y coordinate systems; and wherein said interpolation means comprises:
   means for reading out said displacement of said plurality of said reference points by said rounded values of said X-Y coordinates of said target lattice point.

12. An apparatus in accordance with claim 11, wherein
   said displacement stored in said memory is expressed in said U-V coordinate systems.

13. An apparatus in accordance with claim 11, wherein
   said displacement stored in said memory is expressed in said X-Y coordinate systems.

14. An apparatus in accordance with claim 9, wherein said at least one reference point in each of said matrices includes four corner points of each of said matrices.

15. An apparatus in accordance with claim 9, wherein said at least one reference point in each of said matrices includes a center of each of said matrices.

16. An apparatus in accordance with claim 9, wherein said coordinate correction means comprises:
   means for re-correcting said corrected X-Y coordinates of said target lattice point by a predetermined shift of position such that said reference point in each of said matrices is shifted to a predetermined position apart from symmetric axes of said U-V coordinate systems according to said predetermined shift.

* * * * *